(12) United States Patent
Jeon et al.

(10) Patent No.: US 9,992,544 B2
(45) Date of Patent: *Jun. 5, 2018

(54) METHOD AND SYSTEM FOR REPRODUCING CONTENTS, AND COMPUTER-READABLE RECORDING MEDIUM THEREOF

(71) Applicant: SAMSUNG ELECTRONICS CO., LTD., Gyeonggi-do (KR)

(72) Inventors: Byung-jeong Jeon, Ansan-si (KR); Youn-gun Jung, Yongin-si (KR); Kwan-min Lee, Seoul (KR); Jun-ho Koh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/142,825

(22) Filed: Apr. 29, 2016

(65) Prior Publication Data

US 2016/0241919 A1    Aug. 18, 2016

Related U.S. Application Data

(63) Continuation of application No. 14/168,661, filed on Jan. 30, 2014, now Pat. No. 9,338,517, which is a (Continued)

(30) Foreign Application Priority Data

Apr. 7, 2012 (KR) .................. 10-2012-0036402

(51) Int. Cl.
*H04B 7/00* (2006.01)
*H04N 21/478* (2011.01)
(Continued)

(52) U.S. Cl.
CPC ....... *H04N 21/47815* (2013.01); *G08C 17/02* (2013.01); *H04L 65/4084* (2013.01);
(Continued)

(58) Field of Classification Search
CPC ......... H04N 21/47815; H04N 21/2543; H04N 21/25816; H04N 21/42208;
(Continued)

(56) References Cited

U.S. PATENT DOCUMENTS 6,047,340 A    4/2000 Kase et al.
7,155,305 B2   12/2006 Hayes et al.
(Continued)

FOREIGN PATENT DOCUMENTS

CN    1706209 A    12/2005
CN    201294037 Y    8/2009
(Continued)

OTHER PUBLICATIONS

Communication dated Feb. 22, 2017 issued by the Russian Patent Office in counterpart Russian Patent Application No. 2014144941.
(Continued)

*Primary Examiner* — Marceau Milord
(74) *Attorney, Agent, or Firm* — Sughrue Mion, PLLC

(57) ABSTRACT

A content reproducing method and system for performing seamless playback of contents between devices is provided. The contents reproducing system includes a portable device which, when a short distance communication with a remote control which is configured to control an electronic device occurs during reproducing of contents, generates data required by the electronic device for reproducing the contents that are being reproduced, and which transmits the generated data to the remote control; the remote control which receives the data from the portable device and which transmits the received data to the electronic device, in
(Continued)

conjunction with the occurrence of the short distance communication with the portable device; and the electronic device for receiving the contents from a contents provider and reproducing the contents.

20 Claims, 20 Drawing Sheets

Related U.S. Application Data continuation-in-part of application No. 13/664,928, filed on Oct. 31, 2012, now Pat. No. 8,682,248.

(51) Int. Cl.

| | | |
|---|---|---|
| H04N 21/258 | (2011.01) | |
| H04N 21/422 | (2011.01) | |
| H04N 21/61 | (2011.01) | |
| G08C 17/02 | (2006.01) | |
| H04N 21/4363 | (2011.01) | |
| H04N 21/658 | (2011.01) | |
| H04L 29/06 | (2006.01) | |
| H04N 21/254 | (2011.01) | |
| H04N 21/2543 | (2011.01) | |
| H04N 21/41 | (2011.01) | |
| H04N 21/4627 | (2011.01) | |
| H04N 21/475 | (2011.01) | |

(52) U.S. Cl.
CPC ..... *H04N 21/2541* (2013.01); *H04N 21/2543* (2013.01); *H04N 21/25816* (2013.01); *H04N 21/4126* (2013.01); *H04N 21/42208* (2013.01); *H04N 21/42221* (2013.01); *H04N 21/43637* (2013.01); *H04N 21/4627* (2013.01); *H04N 21/4753* (2013.01); *H04N 21/6106* (2013.01); *H04N 21/6156* (2013.01); *H04N 21/6582* (2013.01)

(58) Field of Classification Search
CPC ....... H04N 21/42221; H04N 21/43637; H04N 21/4627; H04N 21/4753; H04N 21/6106; G08C 17/02; H04L 65/4084
USPC ..... 455/41.2, 556.1, 556.2, 557, 3.06, 414.1
See application file for complete search history.

(56) References Cited

U.S. PATENT DOCUMENTS

| | | | |
|---|---|---|---|
| 7,336,925 B2 | 2/2008 | Zilliacus | |
| 7,756,467 B2 | 7/2010 | Bent et al. | |
| 7,894,854 B2 | 2/2011 | Lee | |
| 8,063,888 B2 | 11/2011 | McFarlane et al. | |
| 8,090,405 B2 | 1/2012 | Lee | |
| 8,107,973 B1 | 1/2012 | Sjothun | |
| 8,159,518 B2 | 4/2012 | Underwood et al. | |
| 8,165,633 B2 | 4/2012 | Chang et al. | |
| 8,195,130 B2 | 6/2012 | Hao et al. | |
| 8,200,868 B1 | 6/2012 | 't Hooft | |
| 8,265,557 B2 | 9/2012 | Chung | |
| 8,279,729 B2 | 10/2012 | Kang et al. | |
| 8,285,211 B2 | 10/2012 | Wang et al. | |
| 8,417,290 B2 | 4/2013 | Wang et al. | |
| 8,654,087 B2 | 2/2014 | Kang et al. | |
| 8,682,248 B2* | 3/2014 | Jeon ..................... | H04B 5/0025 348/571 |
| 8,762,465 B2 | 6/2014 | Kim et al. | |
| 8,788,075 B2 | 7/2014 | Ellis et al. | |
| 8,803,811 B2 | 8/2014 | Kondo et al. | |
| 8,819,429 B2 | 8/2014 | Iwamura | |
| 8,965,460 B1 | 2/2015 | Rao et al. | |
| 9,009,768 B2 | 4/2015 | Agnihotri et al. | |
| 9,055,257 B2* | 6/2015 | Jeon ..................... | H04B 5/0025 |
| 9,077,930 B2* | 7/2015 | Jeon ..................... | H04B 5/0025 |
| 9,201,627 B2 | 12/2015 | Tam et al. | |
| 9,300,783 B2* | 3/2016 | Jeon ..................... | H04B 5/0025 |
| 9,338,517 B2* | 5/2016 | Jeon ..................... | G08C 17/02 |
| 9,477,860 B2 | 10/2016 | Ikeda et al. | |
| 9,553,972 B2* | 1/2017 | Jeon ..................... | H04B 5/0025 |
| 9,699,292 B2* | 7/2017 | Jeon ..................... | H04B 5/0025 |
| 2004/0140965 A1 | 7/2004 | Wang et al. | |
| 2005/0186988 A1 | 8/2005 | Lim et al. | |
| 2006/0233519 A1 | 10/2006 | Narita | |
| 2007/0250772 A1 | 10/2007 | Milosevski | |
| 2007/0287498 A1 | 12/2007 | Wang et al. | |
| 2009/0100474 A1 | 4/2009 | Migos | |
| 2009/0157685 A1 | 6/2009 | Sorensen | |
| 2009/0163139 A1 | 6/2009 | Wright-Riley | |
| 2009/0276862 A1 | 11/2009 | Komori et al. | |
| 2009/0298535 A1 | 12/2009 | Klein et al. | |
| 2010/0011135 A1 | 1/2010 | Jawa et al. | |
| 2010/0245274 A1 | 9/2010 | Fukuda | |
| 2010/0261432 A1 | 10/2010 | Kohno et al. | |
| 2011/0023073 A1 | 1/2011 | McCarthy et al. | |
| 2011/0047474 A1 | 2/2011 | Sung et al. | |
| 2011/0150427 A1 | 6/2011 | Kohno | |
| 2011/0163969 A1 | 7/2011 | Anzures et al. | |
| 2011/0302619 A1 | 12/2011 | Hale et al. | |
| 2012/0175412 A1 | 7/2012 | Grabiner et al. | |
| 2012/0208592 A1 | 8/2012 | Davis et al. | |
| 2012/0220224 A1 | 8/2012 | Walker | |
| 2012/0265696 A1 | 10/2012 | Tuchman et al. | |
| 2012/0311723 A1 | 12/2012 | Britt, Jr. et al. | |
| 2012/0315848 A1 | 12/2012 | Smith et al. | |
| 2013/0024197 A1 | 1/2013 | Jang et al. | |
| 2013/0028132 A1 | 1/2013 | Choi | |
| 2013/0035086 A1 | 2/2013 | Chardon et al. | |

FOREIGN PATENT DOCUMENTS

| | | |
|---|---|---|
| CN | 101990661 A | 3/2011 |
| CN | 102413023 A | 4/2012 |
| JP | 2006-126964 A | 5/2006 |
| JP | 2006-301777 A | 11/2006 |
| JP | 2008-508646 A | 3/2008 |
| JP | 2008-227640 A | 9/2008 |
| JP | 2009-60512 A | 3/2009 |
| JP | 2009-147575 A | 7/2009 |
| JP | 2010-45684 A | 2/2010 |
| JP | 2011-45082 A | 3/2011 |
| RU | 2 392 656 C2 | 6/2010 |
| TW | 201141216 A1 | 11/2011 |
| TW | 201209598 A1 | 3/2012 |
| WO | 2006089555 A1 | 8/2006 |

OTHER PUBLICATIONS

Communication dated Feb. 28, 2017 issued by the Japanese Patent Office in counterpart Japanese Patent Application No. 2013-079542.
Communication dated Apr. 1, 2017 issued by the State Intellectual Property Office of P.R. China in counterpart Chinese Patent Application No. 201310119461.6.
Communication dated Jun. 6, 2016, issued by the Taiwan Intellectual Property Office in counterpart Taiwanese Patent Application No. 102111792.
Communication dated Jul. 15, 2013 issued by the International Searching Authority in International Application No. PCT/KR2013/002897 (PCT/ISA/220, 210, 237).
Communication dated Nov. 5, 2013 issued by the European Patent Office in counterpart European Patent Application No. 13162737.4.
International Search Report (PCT/ISA/210) and Written Report (PCT/ISA/237) dated Jul. 15, 2013 from the International Search Authority in counterpart Application No. PCT/KR2013/002897.
Joao Pedro Sousa, et al; "Aura: An Architectural Framework for User Mobility in Ubiquitous Computing Environments"; Proceedings of the 3rd Working IEEE/IFIP Conference on Software Architecture; XP007917022; Aug. 1, 2002; pp. 1-14.
Jun Rekimoto; "Pick-and-Drop: A Direct Manipulation Technique for Multiple Computer Environments"; Proceedings of the ACM

(56) References Cited

OTHER PUBLICATIONS

Symposium on User Interface Software and Technology; XP002304175; Jan. 1, 1997; pp. 31-39.
Naohiko Kohtake, et al; "InfoStick: an interaction device for inter-Appliance Computing"; Proceedings of HUC: International Symposium Onhandheld and Ubiquitous Computing; vol. 1707; XP002378028; Jan. 1, 1999; 13 pgs.
Pering et al., "Spontaneous Marriages of Mobile Devices and Interactive Spaces", Communications of the ACM, Sep. 1, 2005, vol. 48, No. 9, pp. 53-59, Association for Computing Machinery, Inc., United States, XP058227899.
Communication dated Nov. 9, 2016 issued by the Taiwan Intellectual Property Office in counterpart Taiwanese Patent Application No. 102111792.
Communication dated Dec. 13, 2016 issued by the European Patent Office in counterpart European Patent Application No. 13162737.4.
Communication dated Aug. 29, 2017, issued by the Japanese Patent Office in counterpart Japanese Application No. 2013-079542.

\* cited by examiner

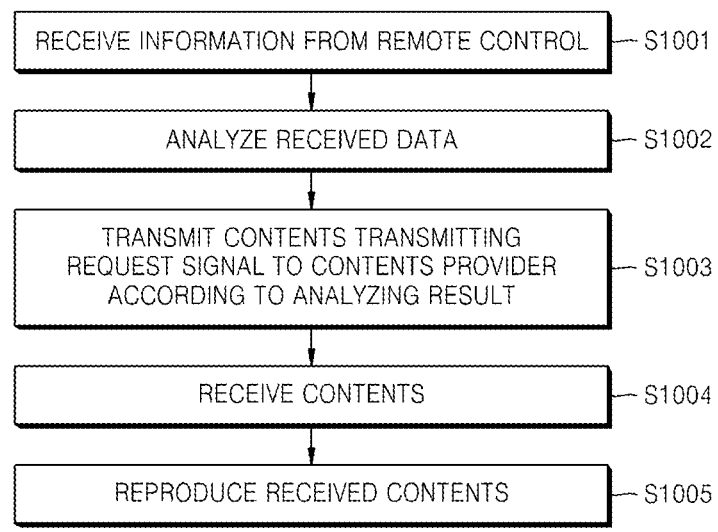
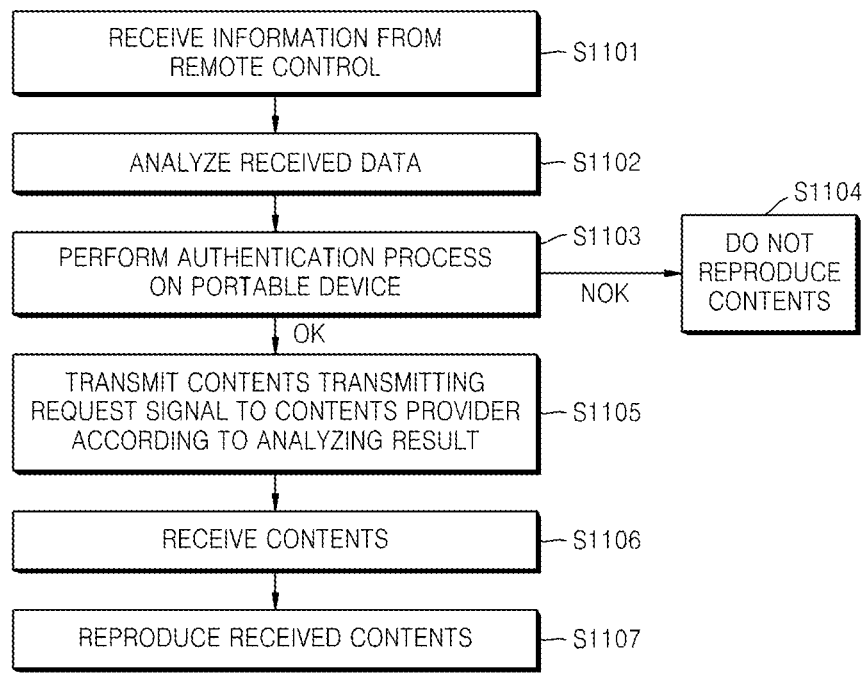

METHOD AND SYSTEM FOR REPRODUCING CONTENTS, AND COMPUTER-READABLE RECORDING MEDIUM THEREOF

CROSS-REFERENCE TO RELATED PATENT APPLICATIONS

This is continuation of application Ser. No. 14/168,661, filed Jan. 30, 2014, which is a continuation-in-part of U.S. patent application Ser. No. 13/664,928, filed on Oct. 31, 2012, which claims priority from Korean Patent Application No. 10-2012-0036402, filed on Apr. 7, 2012, in the Korean Intellectual Property Office, the disclosure of which is incorporated herein by reference in its entirety.

BACKGROUND

1. Field

Exemplary embodiments relate to reproduction of contents, and more particularly, to a method and system for reproducing contents, by which seamless playback of contents is performed between devices.

2. Description of the Related Art

Functions of devices such as smart phones, hand-held personal computers (PCs), tablet PCs, and smart televisions (TVs) have gradually diversified. Accordingly, it has become possible to reproduce the same contents by using different devices.

For example, a user can watch and listen to broadcasting contents, which contents the user is watching and listening to on a smart TV, on a smart phone. A game application which is executed on a smart phone can also be executed on a smart TV. A sound source which is executed on a smart phone can also be executed on a smart TV. Accordingly, there is a need to facilitate a performance of a seamless playback or outputting of contents between devices.

SUMMARY

Exemplary embodiments provide a method and a system for performing a seamless playback of contents between different devices and a computer-readable recording medium thereof.

Exemplary embodiments also provide a method and a system for performing a seamless playback of contents between different devices by sharing information required for reproducing contents between the devices, and a computer-readable recording medium thereof.

Exemplary embodiments also provide a method and a system for performing a seamless playback of contents between different devices based on a near field communication (NFC) contact, and a computer-readable recording medium thereof.

Exemplary embodiments also provide a method and system for seamlessly outputting information between different devices, and a computer-readable recording medium thereof.

According to an aspect of an exemplary embodiment, there is provided a contents reproducing method which is executable by using a portable device, the contents reproducing method including reproducing contents; detecting an occurrence of a short distance communication with a remote control which is configured to control an electronic device; generating data required by the electronic device for reproducing the contents; and transmitting the generated data to the remote control.

The short distance communication may be based on at least one near field communication (NFC) standard.

According to an aspect of another exemplary embodiment, there is provided a contents reproducing method which is executable by using a remote control which is configured to control an electronic device, the contents reproducing method including detecting an occurrence of a short distance communication with a portable device; receiving, from the portable device, data required by the electronic device for reproducing contents that are being reproduced by the portable device; and transmitting the received data to the electronic device.

According to an aspect of another exemplary embodiment, there is provided a portable device which includes a short distance communication unit which performs short distance communication; a touch screen which displays an image which includes contents that are being reproduced, and which receives user input information; and a processor which provides a user interface based on the touch screen, controls a reproduction of the contents, detects an occurrence of a short distance communication with a remote control which is configured to control an electronic device via the short distance communication unit, generates data required by the electronic device for reproducing the contents, and transmits the generated data to the remote control via the short distance communication unit.

According to an aspect of another exemplary embodiment, there is provided a portable device which includes a short distance communication unit which performs short distance communication; a touch screen which displays an image which includes contents that are being reproduced, and which receives user input information; at least one processor which provides a user interface based on the touch screen; and a storage which stores at least one program that is executable by the at least one processor, wherein the at least one program includes commands for reproducing the contents, detecting an occurrence of the short distance communication with a remote controller which is configured to control an electronic device via the short distance communication unit, generating data required by the electronic device for reproducing the contents based on the detecting the occurrence of the short distance communication, and transmitting the generated data to the remote controller.

According to an aspect of another exemplary embodiment, there is provided a remote control which is configured to control an electronic device, the remote control including a short distance communication unit which performs short distance communication with a portable device; a user input unit which inputs user information; and a processor which detects an occurrence of a short distance communication with the portable device via the short distance communication unit, receives data from the portable device via the short distance communication unit, and transmits the received data to the electronic device via a wireless communication unit, wherein the received data includes data required by the electronic device for reproducing contents that are being reproduced by the portable device.

According to an aspect of another exemplary embodiment, there is provided a contents reproducing system which includes a portable device which, when a short distance communication with a remote control which is configured to control an electronic device occurs during a reproducing of contents, generates data required by the electronic device for reproducing the contents, and which transmits the generated data to the remote control; the remote control which receives the transmitted data from the portable device and which transmits the received data to the electronic device based on an occurrence of the short distance communication with the portable device; and the electronic device which receives the contents from a contents provider based on the data received from the remote control and which reproduces the received contents.

According to an aspect of another exemplary embodiment, there is provided a contents reproducing method which is executable by using a portable device, the method including detecting an occurrence of a short distance communication with a remote control which is configured to control an electronic device; receiving, from at least one of the remote control and the electronic device, data required by the portable device for reproducing contents that are being reproduced by the electronic device; receiving the contents from a contents provider, based on the received data; and reproducing the received contents.

According to an aspect of another exemplary embodiment, there is provided a contents reproducing method which is executable by using a remote control which is configured to control an electronic device, the contents reproducing method including detecting an occurrence of a short distance communication with a portable device; receiving, from the electronic device, data required by the portable device for reproducing contents that are being reproduced by the electronic device; and transmitting the received data to the portable device.

According to an aspect of another exemplary embodiment, there is provided a contents reproducing method which is executable by using an electronic device, the contents reproducing method including reproducing contents; receiving, from at least one of a remote control which is configured to control the electronic device and a portable device, a data transmitting request signal relating to data required by the portable device for reproducing the contents; generating the data required by the portable device for reproducing the contents; and transmitting the generated data to at least one of the remote control and the portable device, wherein the data transmitting request signal is received based on an occurrence of a short distance communication between the remote control and the portable device.

According to an aspect of another exemplary embodiment, there is provided a non-transitory computer-readable recording medium having recorded thereon at least one program including commands for executing the above-described contents reproducing method which is executable by using a portable device.

According to an aspect of another exemplary embodiment, there is provided a non-transitory computer-readable recording medium having recorded thereon at least one program including commands for executing the above-described contents reproducing method which is executable by using a remote control which is configured to control an electronic device.

According to an aspect of another exemplary embodiment, there is provided a non-transitory computer-readable recording medium having recorded thereon at least one program including commands for executing the above-described contents reproducing method which is executable by using an electronic device.

BRIEF DESCRIPTION OF THE DRAWINGS

The above and/or other aspects will become more apparent by describing in detail exemplary embodiments with reference to the attached drawings in which:

FIG. 10 is a flowchart which illustrates a contents reproducing method which is executable by using the electronic device, according to an exemplary embodiment;
FIG. 11 is a flowchart which illustrates a contents reproducing method which is executable by using an electronic device, according to another exemplary embodiment.

DETAILED DESCRIPTION

Figure 1A:
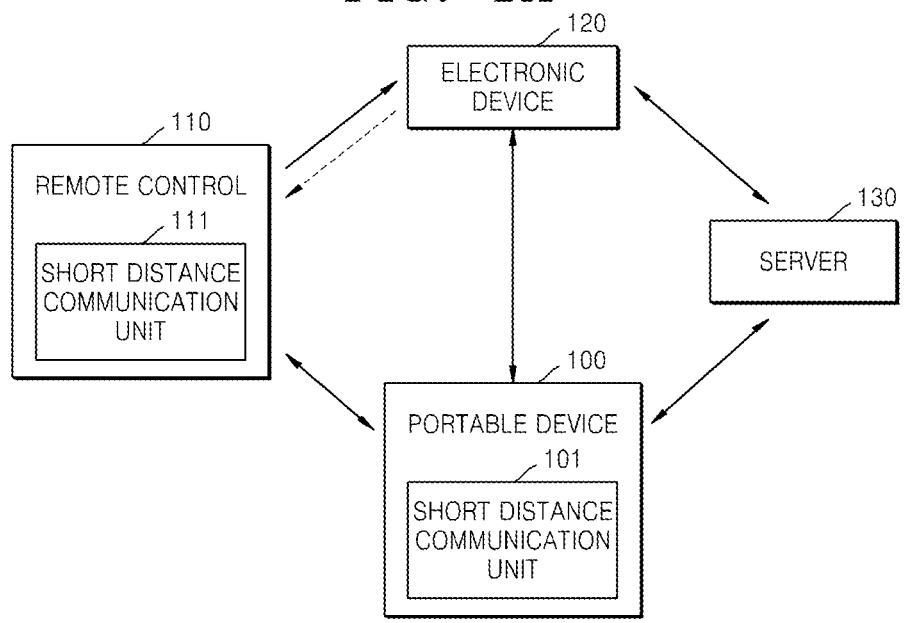
FIG. 1A is a structural diagram of a contents reproducing system according to an exemplary embodiment.

As the detailed description provided herein allows for various changes and numerous embodiments, particular exemplary embodiments will be illustrated in the drawings and described in detail in the written description. However, this is not intended to limit the present disclosure to particular modes of practice, and it is to be appreciated that all changes, equivalents, and substitutes that do not depart from the spirit and technical scope of the present disclosure are encompassed in the present disclosure. In the description provided herein, certain detailed explanations of related art are omitted when it is deemed that they may unnecessarily obscure the essence of the present disclosure.

The terms such as "first" and "second" are used herein merely to describe a variety of constituent elements, but the constituent elements are not limited by the terms. The terms are used only for the purpose of distinguishing one constituent element from another constituent element.

Most of the terms used herein are general terms that have been widely used in the technical art to which the exemplary embodiments pertain. However, some of the terms used herein may be created reflecting intentions of technicians in this art, precedents, or new technologies. Further, some of the terms used herein may be arbitrarily chosen by the present applicant. In this case, these terms are defined in detail below. Accordingly, the specific terms used herein should be understood based on the unique meanings thereof and the whole context of the present disclosure.

As used herein, the singular forms "a", "an" and "the" are intended to include the plural forms as well, unless the context clearly indicates otherwise. It will be further understood that the terms "comprises" or "comprising," when used in this specification, specify the presence of stated features, integers, steps, operations, elements, components, and/or groups thereof, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list.

Throughout this specification, the term "contents" may include a video image, a still image, a sound source, a file, broadcast contents, a text, and/or any other suitable form of contents. In addition, the contents may include social network service-based contents, such as, for example, a mobile messenger, an internet telephone, twitter, and a blog, online shopping site-based contents, information that may be output by a communicable external device such as an appcessory, and application-based contents, but are not limited thereto.

For example, the online shopping site-based contents may include information regarding a shopping item, information regarding a seller, user comment information, and payment information (or transaction information), but are not limited thereto. Information that may be output by an external device may be determined based on functions that may be provided by the external device. For example, when the external device is a pedometer, information that may be output by the external device may include distance information, speed information, and user-specific history information. However, information that may be output by the external device are not limited thereto. Information that may be output by an external device may include information stored in the external device. The application-based contents may include game application-based contents. The contents are not limited thereto.

An appcessory is a device including hardware and software that may operate based on an application and may be a peripheral device or an accessory device.

Throughout this specification, the term "seamless playback of contents," in the reproduction of the contents, refers to a process for continuously reproducing contents by using different devices as if the contents are reproduced by a single device. The seamless playback of contents may also refer to a process for reproducing contents in a same environment or a similar reproducing environment between different devices. Parameters relating to the same or the similar reproducing environment may include, for example, caption settings, equalizer settings, sound settings, resolution, and/or any other suitable parameters relating to a reproducing environment.

For example, when contents that are being reproduced by a first device include movie contents having a 16:9 aspect ratio and a three-dimensional (3D) stereophonic effect, and English subtitles (or English closed caption), seamless playback of contents by a second device may refer to a process for reproducing the movie contents from content corresponding to a time when a reproduction of the contents is stopped in the first device. Here, the reproducing environments of the movie contents reproduced by the second device may not include a 16:9 aspect ratio, a 3D stereophonic effect, and English subtitles.

The time when reproduction of the contents is stopped in the first device is used for understanding a connection relationship between contents that are being reproduced by the first device and contents to be reproduced by the second device with respect to the seamless playback of contents. Thus, the exemplary embodiments are not limited to the case in which a reproduction of contents that are being reproduced by the first device is stopped during the seamless playback of contents.

When contents that are being reproduced by the first device include movie contents having a 16:9 aspect ratio and a 3D stereophonic effect, and English subtitles, the seamless playback of contents by the second device may refer to a process for reproducing movie contents having a 16:9 aspect ratio, a 3D stereophonic effect, and English subtitles from a content corresponding to a time when a reproduction of the movie contents is stopped in the first device.

Information relating to the 16:9 aspect ratio, the 3D stereophonic effect, and subtitles (or closed caption) may be contained in meta data relating to respective contents used throughout this specification.

Furthermore, for example, when contents that are being reproduced by the first device include a mobile messenger by which a user chats with "A," the seamless playback of contents by the second device may refer to a process for opening a chatting window with "A" based on the mobile messenger and continually transmitting and receiving messages to/from "A". Thus, a user may continually transmit and receive messages to/from "A" via the same chatting window which is opened by using the second device.

Furthermore, for example, when contents that are being reproduced by the first device include a game application, the seamless playback of contents by the second device may refer to a process for starting the game application from a game level of the game application, which is executed by using the first device, or reproducing the same game contents as the executed game contents. Thus, the user may continually play the game, which is executed on the first device, by using the second device.

Throughout this specification, user input information may be dependent upon a user gesture. The user gesture may be defined based on an input device. In particular, when the input device is a touch screen-based device, the user gesture may include, for example, but is not limited to, a tap (or a touch), a touch and hold, a touch and drag, a double tap, a drag, a panning, a flick, a drag and drop, a sweep, and/or any other suitable user gesture.

A user gesture which is performed by using the touch screen-based device may be performed by using a user finger or a touch tool (for example, a stylus pen). When the input device is a camera-based device, a user gesture may include a spatial gesture based on an image captured by a camera. When the input device includes physical buttons, a dial, a slider switch, a joystick, a click wheel, and/or any other suitable means for receiving user input, user input information may be dependent upon a physical control of the user with respect to the input device.

Throughout the specification, NFC contact may refer to NFC tagging.

Hereinafter, the present inventive concept will be described in detail by explaining exemplary embodiments with reference to the attached drawings. The same reference numerals in the drawings denote like elements, and a repeated description thereof will not be provided.

FIG. 1A is a structural diagram of a contents reproducing system according to an exemplary embodiment. FIG. 1A may refer to a structural diagram of a network for performing a contents reproducing method according to an exemplary embodiment. The contents reproducing system shown in FIG. 1 includes a portable device 100, a remote control device 110 which is configured to control an electronic device 120, the electronic device 120, and a server 130.

However, the contents reproducing system according to the present exemplary embodiment is not limited to the case shown in FIG. 1A. For example, the contents reproducing system according to the present exemplary embodiment may include a plurality of servers which provide respective contents. In addition, the contents reproducing system according to the present exemplary embodiment may include the portable device 100, the remote control 110, and the electronic device 120. In the aforementioned example relating to the seamless playback of contents, the portable device 100 and the electronic device 120 may be exemplified as a first device and a second device, respectively.

In the contents reproducing system shown in FIG. 1A, when short distance communication units 101 and 111 are configured, a seamless playback of contents may be performed according to an occurrence of an NFC contact based on a user's intention, a small amount of data may be transmitted between the portable device 100 and the remote control 110, and information may be transmitted for user authentication between the portable device 100 and the electronic device 120 or between the portable device 100 and the remote control 110.

The small amount of data transmitted between the portable device 100 and the remote control 110, for example, may include data that has to be shared between the portable device 100 and the remote control 110 for seamlessly reproducing contents, but is not limited thereto. The data to be shared will be described later.

An example of the portable device 100 shown in FIG. 1A may include a smart phone, a notebook, a tablet PC, a mobile device, a handheld device or a handheld computer, a media player, a personal digital assistant (PDA), and/or any other suitable type of portable device.

The portable device 100 includes the short distance communication unit 101 which is usable for performing short distance communication. The short distance communication unit 101 may include, for example, at least one of an NFC-based communication chip, a radio frequency identification (RFID)-based communication chip, and other short distance communication chips.

When the short distance communication unit 101 is configured based on NFC standards, the short distance communication unit 101 may include an active circuit for transmitting and receiving data and information to and from the short distance communication unit 111 when the short distance communication unit 101 contacts the short distance communication unit 111 or is brought into relatively close physical proximity with respect to the short distance communication unit 111 at a predetermined distance. In this case, the short distance communication unit 111 may include a passive NFC tag, but may also include the active circuit. The predetermined distance may be set to approximately within a range of between zero and 20 centimeters, but is not limited thereto.

When the short distance communication unit 101 is configured based on RFID, the short distance communication unit 101 may include an active circuit for transmitting and receiving data and information to and from the short distance communication unit 111 at a relatively far distance, as compared with a case in which the short distance communication unit 101 is configured based on NFC. In this case, the short distance communication unit 111 may include a passive RFID tag, but may also include the active circuit.

In addition, a button (not shown) for inputting a user intention relating to whether the contact between the short distance communication units 101 and 111 or the physical approach is valid with respect to the portable device 100 may be installed on the portable device 100, thereby preventing the short distance communication unit 101 from operating when an unnecessary contact or unnecessary physical approach occurs between the short distance communication units 101 and 111.

The short distance communication unit 101 may convert data for transmission to the short distance communication unit 111 into a data which has a short distance communication data exchange format, and may transmit the converted data to the short distance communication unit 111. The short distance communication data exchange format may be NFC data exchange format (NDEF) in the case where the short distance communication units 101 and 111 are based on the NFC format. However, short distance communication data exchange formats are not limited thereto. Accordingly, when data is transmitted to the short distance communication unit 111, the short distance communication unit 101 may transmit data by writing data to the short distance communication unit 111.

In addition, the short distance communication unit 101 may convert a short distance communication data exchange format data which is received from the short distance communication unit 111 into data that is processable by the portable device 100. The data that is processable by the portable device 100 may be determined based on at least one from among, for example, the operating system of the portable device 100, the manufacturer of the portable device 100, and the model of the portable device 100, but is not limited thereto. For example, if the portable device 100 is based on the Android OS, the manufacturer of the portable device 100 is Samsung Electronics, and the model of the portable device 100 is the Note, data that is processable by the portable device 100 may be determined based on at least one from among the above-stated conditions.

For example, when NDEF-based data is received and the portable device 100 is an Android-based device, the short distance communication unit 101 may convert the NDEF-based data to data that is processable by the Android OS.

As described above, when the short distance communication unit 101 receives data from the short distance communication unit 111, the short distance communication unit 101 may receive the data by reading the data from the short distance communication unit 111.

The short distance communication unit 111 may include at least one of a passive NFC tag and a passive RFID tag, when the remote control 110 is capable of one-way communication with the electronic device 120. However, when the remote control 110 and the electronic device 120 are capable of two-way communication, the short distance communication unit 111 may include an active circuit for performing a read function or a write function.

In particular, when the short distance communication unit 111 includes an active circuit and transmits data to the short distance communication unit 101, the short distance communication unit 111 may transmit the data by writing the data to the short distance communication unit 101. In addition, when the short distance communication unit 111 includes an active circuit and receives data from the short distance communication unit 101, the short distance communication unit 111 may receive the data by reading the data from the short distance communication unit 101.

When the short distance communication units 101 and 111 are configured based on NFC, each of the short distance communication units 101 and 111 may be used as an NFC interface. When the short distance communication units 101 and 111 are configured based on RFID, each of the short distance communication units 101 and 111 may be used as an RFID interface.

The remote control 110 is a device which is configured to control the electronic device 120. As described above, the remote control 110 may be configured to control the electronic device 120 while one-way communication or two-way communication with the electronic device 120 is performed.

The electronic device 120 is a media reproducing device, a content reproducing device, or an information outputting device that is controllable by using the remote control 110. The electronic device 120 may include, for example, a TV having a communication function or a digital consumer electronics (CE) device having a communication function. The digital CE device may include, for example, a refrigerator, an audio system, and/or any other suitable type of digital CE device, and may also include a digital television (DTV) or an Internet protocol television (IPTV).

The server 130 provides contents that are requested by at least one of the electronic device 120 and the portable device 100. The server 130 may include a contents providing server which is connected via a web page, a broadcasting contents providing server, an online shopping site-based server, a server providing information relating to an application which is related to an external device such as an appcessory, and/or a cloud server, a home gateway, and/or any other suitable type of server device.

The server 130 may store contents and data required for reproducing the contents based on a request of either of both of the electronic device 120 and the portable device 100. The contents and the data required for reproducing the contents, which are stored in the server 130, may be provided from either or both of the electronic device 120 and the portable device 100. However, the server 130 may collect the contents and the data required for reproducing the contents from another database server (not shown).

In the contents reproducing system shown in FIG. 1A, when the portable device 100 reproduces contents, based on an occurrence of a short distance communication between the short distance communication units 101 and 111, data to be shared between the portable device 100 and the electronic device 120 may be transmitted via the remote control 110 in order to perform the seamless playback of contents by using the electronic device 120.

The data to be shared may include, for example, identification information regarding contents being reproduced by the portable device 100, information regarding a provider of contents, and information regarding a playback position of contents being reproduced by the portable device 100 when the short distance communication occurs, but is not limited thereto.

The information regarding the playback position of contents being reproduced by the portable device 100 may include, for example, information regarding a playback time of the content. In other words, if the total playback time of a contents is 60 minutes and content corresponding to a reproduction time of 36 minutes and 20 seconds is being reproduced when the short distance communication occurs, the information regarding the reproduction position of contents may include time information indicating 36 minutes and 20 seconds or time information including the total playback time and the time information indicating 36 minutes and 20 seconds. However, the present inventive concept is not limited thereto. For example, the information regarding the reproduction position of contents may include frame identification information.

In the contents reproducing system shown in FIG. 1A, when the electronic device 120 reproduces contents, based on an occurrence of a short distance communication between the short distance communication units 101 and 111, data to be shared between the electronic device 120 and the portable device 100 may be transmitted via the remote control 110 or by direct communication between the electronic device 120 and the portable device 100 in order to perform the seamless playback of contents by using the portable device 100. However, the present inventive concept is not limited thereto. For example, the data to be shared may be transmitted between the portable device 100 and the electronic device 120 via the server 130.

In order for the portable device 100 or the electronic device 120 to perform the seamless playback of contents reproduced by the portable device 100 at a later time, information which is required for reproducing the contents may be transmitted to and stored in the server 130, and the information stored in the server 130 may be downloaded and used by the portable device 100 or the electronic device 120 to seamlessly reproduce the contents, if necessary.

In addition, in order for the portable device 100 or the electronic device 120 to perform the seamless playback of contents reproduced by the electronic device 120 at a later time, information which is required for reproducing the contents may be transmitted to and stored in the server 130.

Figure 1B:
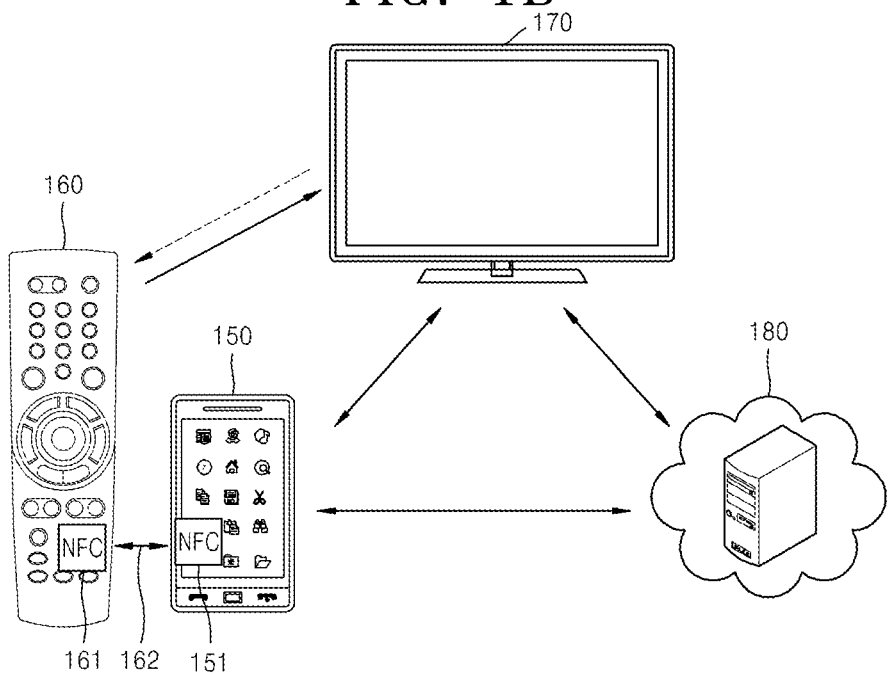
FIG. 1B is an example of the contents reproducing system of FIG. 1A.

In the contents reproducing system shown in FIG. 1A, in a case in which the portable device 100 is a smart phone, the electronic device 120 is a TV, and each of the short distance communication units 101 and 111 is an NFC-based communication module, the content reproducing system shown in FIG. 1A functions as a content reproducing system which is shown in FIG. 1B.

The contents reproducing system shown in FIG. 1B includes a smart phone 150 which includes an NFC-based communication module 151, a remote control 160 which includes an NFC-based communication module 161 and is configured to control a TV 170, the TV 170 that is controllable by using the remote control 160, and a server 180 that is connected to the TV 170 and the smart phone 150 and that provides information to each of the TV 170 and the smart phone 150.

Thus, in the contents reproducing system shown in FIG. 1B, when the smart phone 150 reproduces contents, based on an occurrence of a short distance communication (or contact) between the NFC-based communication module 151 of the smart phone 150 and the NFC-based communication module 161 of the remote control 160, data to be shared between the TV 170 and the smart phone 150 may be transmitted via the remote control 110 in order to perform the seamless playback of contents by using the TV 170.

In the contents reproducing system shown in FIG. 1B, when the TV 170 reproduces contents, based on an occurrence of a short distance communication (or contact) between the NFC-based communication module 151 of the smart phone 150 and the NFC-based communication module 161 of the remote control 160, data to be shared between the TV 170 and the smart phone 150 may be transmitted via the remote control 160 or by direct communication between the TV 170 and the smart phone 150 in order to perform the seamless playback of content by using the smart phone 150. However, transmission of the data to be shared in the contents reproducing system shown in FIG. 1B is not limited to the above-described example, similarly as described above with respect to FIG. 1A.

Figure 2:
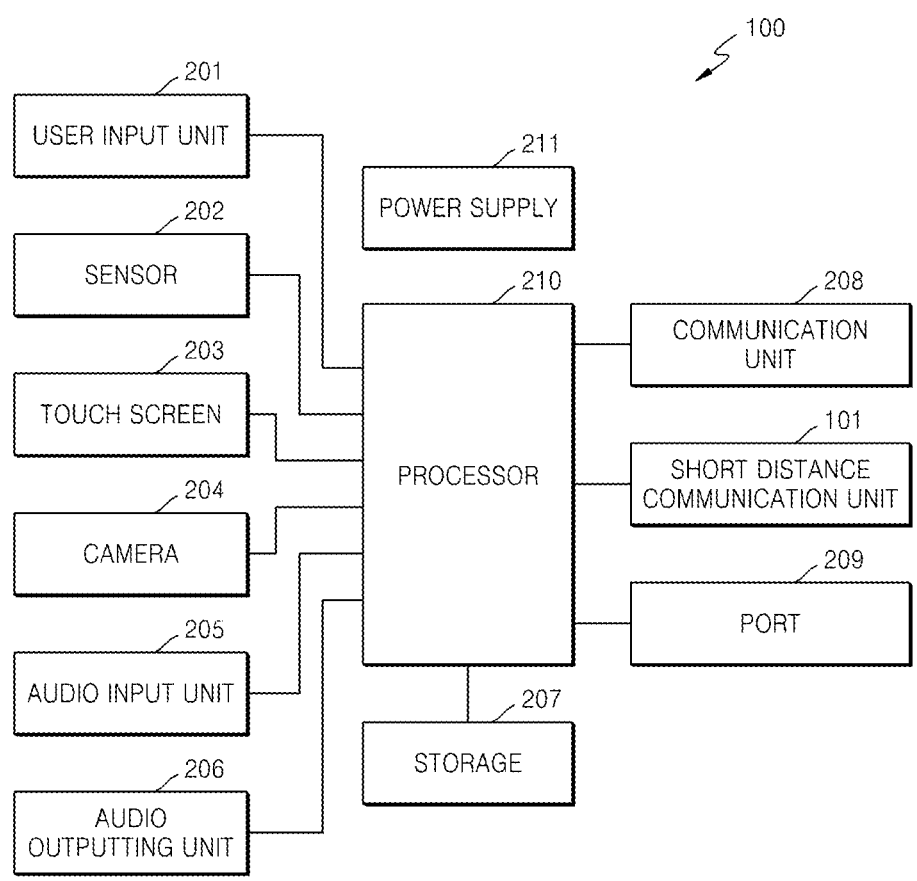
FIG. 2 is a functional block diagram which illustrates a portable device as shown in FIG. 1A, according to an exemplary embodiment.

FIG. 2 is a functional block diagram of the portable device 100 shown in FIG. 1A, according to an exemplary embodiment.

Referring to FIG. 2, the portable device 100 includes a user input unit 201, a sensor 202, a touch screen 203, a camera 204, an audio input unit 205, an audio output unit 206, a storage 207, a communication unit 208, a port 209, a processor 210, a power supply 211, and a short distance communication unit 101. The configuration of the portable device 100 is not limited to the case illustrated in FIG. 2. In other words, the portable device 100 may include more components or less components than the components shown in FIG. 2.

The user input unit 201 generates input data (or control data) for controlling an operation of the portable device 100 or the above-described user input information. The user input unit 201 may include, for example, at least one of a key pad, a dome switch, a touch pad that replaces a mouse, a jog wheel, a jog switch, hardware (H/W) buttons, and/or any other suitable means for receiving user input.

The sensor 202 detects a current state of the portable device 100, such as, for example, a position of the portable device 100, user contact, a bearing of the portable device 100, acceleration or deceleration of the portable device 100, and/or any other suitable parameter relating to the current state of the portable device 100, and generates a sensing signal for controlling an operation of the portable device 100. The sensor 202 may include a proximity sensor.

The proximity sensor refers to a sensor for detecting the presence of an object that approaches at least one of a predetermined detection surface and an object located in the vicinity of the sensor by using an electromagnetic field force or infrared rays in an absence of physical contact. Examples of the proximity sensor may include any one or more of a transmissive photoelectric sensor, a direct reflection-type photoelectric sensor, a mirror reflective-type photoelectric sensor, a high-frequency oscillation-type proximity sensor, a capacitive proximity sensor, a magnetic type proximity sensor, an infrared ray proximity sensor, and/or any other suitable type of proximity sensor.

User input information which is obtained by using the touch screen 203 may be generated based on a user selection or a user request, which may be manifested as a user gesture. Similarly as the above-described example of the user gesture, the user gesture may be variously defined according to various combinations of the number of touches, a touch pattern, and a touch intensity.

In addition, the touch screen 203 may include various sensors for detecting a touch or a proximity touch of the touch screen 203. The sensor included in the touch screen 203 includes a sensor which detects a user gesture or pattern on the touch screen 203 and which may generate a signal obtained by sensing at least one of a drag, a flick, a tap, a touch and hold, a touch and drag, a double tap, a panning, a sweep, and/or any other suitable form of user touch input, which are recognized as a user gesture on the touch screen 203.

An example of the sensor for detecting a touch of the touch screen 203 may include a tactile sensor. The tactile sensor may detect various pieces of information, such as, for example, the roughness of a contact surface, the hardness of a contacted object, a temperature of a contacted point, and the like. A touch of the touch screen 203 may be generated by touching a panel with a pointer. The touch may include a multi-touch. A proximity touch of the touch screen 203 corresponds to a case in which a pointer does not actually touch the touch screen 203, but instead approaches the touch screen 203 at a predetermined adjacent distance. The pointer is a tool for touching or proximity-touching a predetermined portion of the touch screen 203. Examples of the pointer may include a stylus pen, a finger, and/or any other suitable type of pointer. Thus, the pointer will also be referred to as an external input device.

The touch screen 203 outputs information that is processed by the portable device 100. For example, the touch screen 203 displays an image in response to a user gesture or a touch pattern which is detected by the sensor 202 included in the touch screen 203, control data or user input information which is received via the user input unit 201, or a sensing signal that is provided by the sensor 202.

The touch screen 203 will also be referred to as an input and output device. When the touch screen 203 is an input and output device, an image displayed on the touch screen 203 includes a user interface (UI) image or a graphic user interface (GUI) image. The UI image or the GUI image are stored in the storage unit 207 in advance and, if necessary, may be read out from the storage unit 207 and displayed on the touch screen 203. The UI image or the GUI image may be stored in the storage unit 207 in advance by a user or the manufacture of the portable device 100. The touch screen 203 may display an image which includes information relating to contents that are being reproduced and may receive the user input information.

The touch screen 203 may include, but is not limited to, a liquid crystal display, a thin film transistor-liquid crystal display, an organic light-emitting diode display, a flexible display, a three-dimensional (3D) display, an active-matrix organic light-emitting diode (AMOLED) display, and/or any other suitable type of display. The touch screen 203 will also be referred to as a display. The portable device 100 may include two or more touch screens 203 may be included according to a configured type of the portable device 100. For example, if the portable device 100 includes both sides (for example, the front side and the back side) touch screens, the portable device 100 may include two touch screens.

The camera 204 processes an image frame of a still image or a video image which is obtained by an image sensor in a video call mode or a photograph mode. In addition, the processed image frame may be displayed on the touch screen 203. The image frame processed by the camera 204 may be stored in the storage 207 or may be transmitted outside the portable device 100 via the communication unit 208 or the port 209. The portable device 100 may include two or more cameras 204 may be included according to a configured type of the portable device 100. For example, the portable device 100 may include a front camera and a rear camera. The camera 204 may be used as an input device for recognizing a user's spatial gesture.

The audio input unit 205 receives an external sound signal, converts the external sound signal into electrical sound data, and transmits the electrical sound data to the processor 210 in at least one of a call mode, a record mode, a voice recognition mode, and/or any other suitable mode for transmitting sound data. The audio input unit 205 may include, for example, a microphone. The audio input unit 205 may be configured to implement various noise removing algorithms for removing noise generated during a process for receiving the external sound signal. The sound signal that is received by using the audio input unit 205 may contain user input information based on a natural language for performing a method of reproducing contents according to an exemplary embodiment. The user input information based on a natural language may refer to voice-recognition based user input information. The external sound signal that is received via the audio input unit 205 may be stored in the storage 207 or may be transmitted by the portable device 100 via at least one of the communication unit 208 and the port 209.

The user input unit 201, the sensor 202, the touch screen 203, the camera 204, and the audio input unit 205 may each also be referred to as an input device or an input/output device according to a user interface function between the portable device 100 and a user. For example, when the user interface function between the portable device 100 and the user has a touch recognition function, a voice recognition function, and a spatial gesture recognition function, each of the user input unit 201, the sensor 202, the camera 204, and the audio input unit 205 may also be referred to as an input device, and the touch screen 203 may be referred to as an input/output device.

The audio output unit 206 outputs at least one of a sound signal and an audio signal which is received from an external source in a call mode, an audio reproducing mode, and/or any other mode which is suitable for receiving an audio signal. The audio output unit 206 may include a speaker. According to the present exemplary embodiment, when the portable device 100 reproduces contents, if the reproduced contents include an audio signal, the audio output unit 206 outputs the audio signal included in the reproduced contents. The audio input unit 205 and the audio output unit 206 may be integrated with each other, such as, for example, a headset.

The storage 207 stores a resource and at least one program that is executable by the processor 210 that will be described below. The at least one program may include a program for performing a contents reproducing method according to an exemplary embodiment, an operating system (OS) program of the portable device 100, an application that is set in the portable device 100, and one or more programs which are respectively required for performing various functions (for example, a communication function and a display function) of the portable device 100, but is not limited thereto. The program stored in the storage unit 207 may be loaded to the processor 210 and executed thereby.

The resource stored in the storage unit 207 may include at least one of meta data relating to the contents according to the aforementioned exemplary embodiments, device information relating to the portable device 100, user information relating to the portable device 100, information required for executing an application that resides in the portable device 100, and programs required for performing the above-described functions.

If a program for performing the contents reproducing method according to an exemplary embodiment is an application which resides in the portable device 100, information required to operate the application may include at least one from among, for example, UI image information provided via the touch screen 203, GUI image information provided via the touch screen 203, guidance information provided via the touch screen 203, user input information, program identification information, program version information, information regarding location (e.g., uniform resource locator (URL)) of a server providing the program, information for accessing a server for program update (e.g., log-in information), and arbitrary information required for executing the program, but such information is not limited thereto.

Information required for executing programs for performing various functions of the portable device 100 may include at least one from among UI image information provided via the touch screen 203, GUI image information provided via the touch screen 203, guidance information provided via the touch screen 203, user input information, and arbitrary information required for executing the program, but such information is not limited thereto.

In addition, the storage 207 includes information for generating data required by the electronic device 120 for performing a seamless playback of the contents that are being reproduced by the portable device 100.

Information for generating required data for seamless reproduction of the content by the electronic device 120 may include at least one from among identification information regarding the electronic device 120 (e.g., information regarding model name of the electronic device 120 and information regarding the manufacturer of the electronic device 120), information regarding content reproducing environments of the electronic device (e.g., resolution information, information indicating whether 2D contents and 3D contents, etc.), a command set for controlling the electronic device 120 (e.g., information regarding binary codes corresponding to play command or stop command that is defined by the electronic device 120, and operating condition information of the electronic device 120 (e.g., binary data indicating whether the electronic device 120 searches for a playback position by using time information or frame information), information related to a communication protocol of the electronic device 120, or information related to a communication protocol of the remote control 110, but such information is not limited thereto.

Data required by the electronic device 120 may include at least one of information relating to a contents provider, device-specific information relating to the portable device 100, user information relating to the portable device 100, meta data relating to contents that are reproduced, and information relating to a time when contents are reproduced, which corresponds to a time when an occurrence of a short distance communication is detected, but such data is not limited thereto. The meta data relating to the contents may include title information relating to the contents and the above-described contents reproducing environment information. The information relating to the contents provider may include content receiving channel information and URL of a contents providing server, but such meta data is not limited thereto.

The storage 207 may independently include a storage which stores at least one program which is required for performing various functions of the portable device 100, and a storage which stores at least one program for performing the contents reproducing method according to an exemplary embodiment, resources, and applications, in addition to the above-described OS system.

The storage 207 may include at least one of a high-speed random access memory, a magnetic disc storing device, a non-volatile memory such as a flash memory, and/or other non-volatile memories. Thus, the storage 207 may be referred to as a memory.

Programs stored in the storage 207 may be divided into a plurality of modules according to their functions. In particular, programs stored in the storage 207 may be divided into an operating module, a communication module, a graphic module, an input module, and/or any other suitable type of program module, but the exemplary embodiments are not limited thereto.

The communication module may include, but is not limited to, at least one of a broadcast receiving module, a mobile communication module, a wireless Internet module, a wired Internet module, a short distance communication module, and a position information module, as described below with respect to the communication unit 208. The short distance communication module may include at least one of an NFC module, a Bluetooth module, a WiFi direct module, an RFID module, and/or any other suitable type of module.

The input module may include, but is not limited to, at least one of a touch module based on the touch screen 203, a hardware key input module based on the user input unit 201, a position recognition module of the portable device 100 and a motion recognition module, based on the sensor 202, a module for recognizing user contact, a module for recognizing acceleration or deceleration of the portable device 100, a motion recognition module based on the camera 204, and/or any other suitable type of module.

The position information module may include, but is not limited to, a position tracing module of the portable device 100, which is based on a global positioning system (GPS).

The graphic module may adjust the image quality on the touch screen 203 during the seamless playback of contents between devices, but is not limited thereto.

According to the present exemplary embodiment, the application module stored in the storage 207 may include a module for seamless playback of contents between devices. The module for seamless playback of contents between devices may be configured as a module for seamless playback of contents between devices in conjunction with NFC contact between the NFC-based communication module 161 of the remote control 160 of FIG. 1B and the NFC-based communication module 151 of the smart phone 150, or alternatively, may include at least one of various modules based on short distance communication other than the NFC contact between devices. In other words, the module for seamless playback of contents between devices may include a Bluetooth-based module, for example. The Bluetooth-based module may detect occurrence of a short distance communication between devices by using Bluetooth Low Energy (BLE) and may seamlessly reproduce contents between the devices.

The module for seamless playback of contents between devices may be classified into various modules such as a module for seamless playback of contents from the portable device 100 only to an electronic device 120, a module for seamless playback of contents from an external device (not shown) only to the portable device 100, and a module obtained by combining these two modules, but is not limited thereto.

The communication unit 208 may be configured to transmit and receive data to and from the electronic device 120 and the server 130 via a wireless network such as wireless Internet, wireless intranet, a wireless telephone network, a wireless LAN, Wi-Fi network, Wi-Fi direct (WFD) network, 3 generation (3G) network, 4G Long Term Evolution network, Bluetooth network, infrared data association (IrDA) network, RFID network, ultra wideband (UWB) network, ZigBee network, and NFC network or a wired network such as wired Internet.

When both of the short distance communication unit 101 and the communication unit 208 are based on RFID, the communication unit 208 may include an RFID-based communication unit having a further maximum communication distance than an RFID-based communication unit included in the short distance communication unit 101.

The communication unit 208 may include, but is not limited to, at least one of a broadcast receiving module, a mobile communication module, a wireless Internet module, a wired Internet module, a short distance communication module, and a position information module.

The broadcast receiving module receives a broadcast signal and/or broadcast-related information from an external broadcast management server via a broadcast channel. The broadcast channel may include a satellite channel or a terrestrial channel. The mobile communication module transmits and receives a wireless signal with at least one of a base station, an external device (for example, the electronic device 120), and the server 130 on a mobile communication network. The wireless signal may include at least one of a sound call signal, a video call signal, and/or various types of data according to transmission of a text/multimedia message. The wireless Internet module may refer to a module for wireless Internet access. The wired Internet module may refer to a module for wired Internet access.

The short distance communication module may refer to a module for short distance communication. In addition, the short distance communication module may use a short distance communication technology such as at least one of Bluetooth network, RFID network, IrDA network, UWB network, ZigBee network, WFD network, NFC network, and/or any other suitable communication technology. The position information module may include a module for checking or obtaining a position of the portable device 100. An example of the position information module may be a GPS module. The GPS module receives position information from a plurality of artificial satellites. The position information may include coordinate information which is indicated by latitude and longitude.

The port 209 may transmit and receive data to and from an external device (not shown) by using a plug-and-play interface such as a universal serial bus (USB) port (not shown). The plug-and-play interface may refer to a module that automatically recognizes the external device when the external device is inserted into a plug of the portable device 100.

The power supply 211 supplies power to various components of the portable device 100. The power supply 211 includes one or more power supplies, such as for example, a battery or an alternating current (AC) power supply. The portable device 100 may not include the power supply 211 and may include a connection unit (not shown) that is capable of being connected to an external power supply (not shown).

The processor 210 may control an overall operation of the portable device 100 and may also be referred to as one or more processors. Although FIG. 2 shows a case in which the processor 210 is configured as a single chip, the processor 210 may also be referred to as one or more processors because the processor 210 may be classified into a plurality of processors and may operate according to functions of the portable device 100.

The processor 210 may control overall operations of the user input unit 201, the sensor 202, the touch screen 203, the camera 204, the audio input unit 205, the audio output unit 206, the storage 207, the communication unit 208, the port 209, and the short distance communication unit 101. Thus, the processor 210 may also be referred to as a controller, a microprocessor, a digital signal processor, or the like. In addition, the processor 210 may provide a user interface by using at least one of the user input unit 201, the sensor 202, the touch screen 203, the camera 204, and the audio input unit 205.

The processor 210 may execute at least one program that is related to a contents reproducing method according to an exemplary embodiment. The processor 210 may read the program from the storage 207 and may execute the program, or alternatively, may download the program from an external device such as an application providing server (not shown) or a market sever (not shown) which is connected to the processor 210 via the communication unit 208 and may execute the program. The processor 210 may include an interface function unit between various functional modules inside the portable device 100 and the processor 210. An operation of the processor 210, which is related to a contents reproducing method according to an exemplary embodiment, may be performed, as shown in the flowcharts of FIGS. 5, 6, 7, 16A, and 16B which will be described below.

Figure 3:
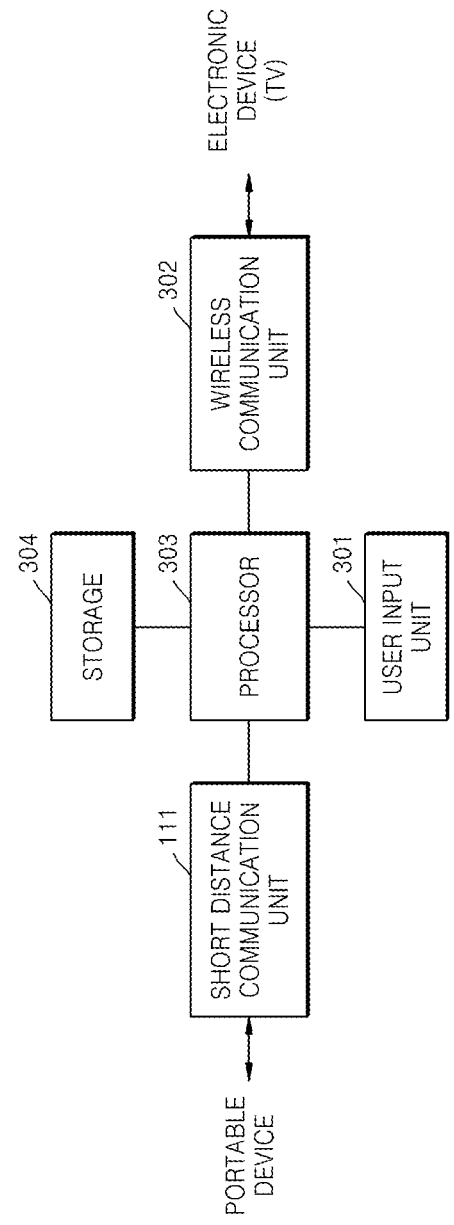
FIG. 3 is a functional block diagram which illustrates a remote control as shown in FIG. 1A, according to an exemplary embodiment.

FIG. 3 is a functional block diagram of the remote control 110 shown in FIG. 1A, according to an exemplary embodiment. Referring to FIG. 3, the remote control 110 includes the short distance communication unit 111, a user input unit 301, a wireless communication unit 302, a processor 303, and a storage 304.

The user input unit 301 may receive a user command and/or user input information using a key button or a touch.

The wireless communication unit 302 performs wireless communication in order to transmit data transmitted from the processor 303 to the electronic device 120. The wireless communication unit 302 is capable of transmitting and/or receiving data to and/or from the wireless communication unit 401 of FIG. 4. The wireless communication unit 302 may convert data transmitted from the processor 303 to data format according to the communication protocol to be used with the wireless communication unit 401 and transmit the converted data to the wireless communication unit 401.

For example, when the remote control 110 includes an IrDA-based remote control that one-way communicates with the electronic device 120, the wireless communication unit 302 may include an infrared (IR) transmitter. When the wireless communication unit 302 includes the IR transmitter, the wireless communication unit 302 irradiates infrared rays to the electronic device 120 in order to transmit data to the electronic device 120 according to the infrared-ray communication method.

To this end, the wireless communication unit 302 converts data received from the processor 303 to infrared-ray signals and transmits the infrared-ray signals to the electronic device 120. The data received from the processor 303 is dependent upon the user command and/or user input information and/or data received via the short distance communication unit 111.

In particular, when an occurrence of a short communication in conjunction with a contact between the short distance communication unit 111 and the short distance communication unit 101 or an approach between the short distance communication unit 111 and the short distance communication unit 101 at a predetermined adjacent distance is detected, data required by the electronic device 120 for reproducing contents received from the portable device 100 is transmitted from the short distance communication unit 111 to the processor 303. The processor 303 transmits the data received from the short distance communication unit 111 to the wireless communication device 302.

The processor 303 may be configured to transmit data received via the short distance communication unit 111 to the electronic device 120 via the wireless communication unit 302 when the processor 303 receives a data transmitting request signal via the user input unit 301. To this end, the processor 303 may store the received data in the storage 304.

In addition, the processor 303 may be configured to transmit a power-on request signal to the electronic device 120 via the wireless communication unit 302 when the processor 303 detects the occurrence of the short distance communication. In this case, the processor 303 may be configured to generate the above-described power-on request signal differently from a power-on request signal that is received by the electronic device 120 based on a control of a power on/off button (not shown) included in the user input device 301.

For example, when a power-on request signal is transmitted as the occurrence of a short distance communication is detected, the power-on request signal may be transmitted after data "0" is added to the preamble of the power-on request signal, and a power-on request signal according to a control of a power on/off button (not shown) included in the user input unit 301 may be transmitted after data "1" is added to the preamble of the power-on request signal. The electronic device 120 is configured to analyze information included in the preamble of a received power-on request signal and to determine whether the received power-on request signal is a power-on request signal according to the occurrence of a short distance communication or power-on request signal according to a control of a power on/off button (not shown) included in the user input unit 301.

When the occurrence of the short distance communication is detected and then data is received from the portable device 100, the processor 303 may transmit data received from the portable device 100 together with a power-on request signal to the electronic device 120.

The electronic device 120 may be powered on in accordance with a power on/off state of the electronic device 120. In particular, when the electronic device 120 is in a power-on state, the electronic device 120 disregards the received power-on request signal. When the electronic device 120 is in a power-off state, the electronic device 120 may be powered on in response the received power-on request signal.

When the communication protocol between the remote control 110 and the electronic device 120 is a radio frequency (RF) communication-based protocol for two-way communication, the wireless communication unit 302 may include an RF module.

When the wireless communication unit 302 includes an RF module, the processor 303 may transmit data received from the short distance communicating unit 111 to the wireless communication unit 302. The wireless communication unit 302 converts the data received from the processor 303 to RF signals and transmits the RF signals to the electronic device 120. In addition, if the wireless communication module 302 is a RF module and contents being produced by the electronic device 120 are to be seamlessly reproduced by the portable device 100, the processor 303 may transmit a request for data required for reproducing contents by the portable device 100 to the electronic device 120 via the wireless communication unit 302, and may receive the data required for reproducing contents from the electronic device 120.

In addition, the processor 303 may monitor the power on/off state of the electronic device 120 by using two-way communication with the electronic device 120 via the wireless communication unit 302, and may store the monitoring result in the storage 304. When the occurrence of the short distance communication is detected, the processor 303 may determine whether the power-on request signal to the electronic device 120 is generated, based on information relating to the power on/off state of the electronic device 120, which is stored in the storage 304. Then, according to a result of the determination, the processor 303 may transmit the power-on request signal to the electronic device 120 via the wireless communication 302.

The wireless communication unit 302 may be configured based on short distance communication such as Bluetooth standard format (e.g., Bluetooth 4.0). In this case, the wireless communication unit 203 converts data received from the processor 303 to a data format that may be transmitted via a Bluetooth standard format and transmits the converted data to the electronic device 120. If the wireless communication unit 302 is configured based on a Bluetooth standard format, the wireless communication unit 302 may be integrated with the short distance communication unit 111 to constitute one chip.

Figure 4:
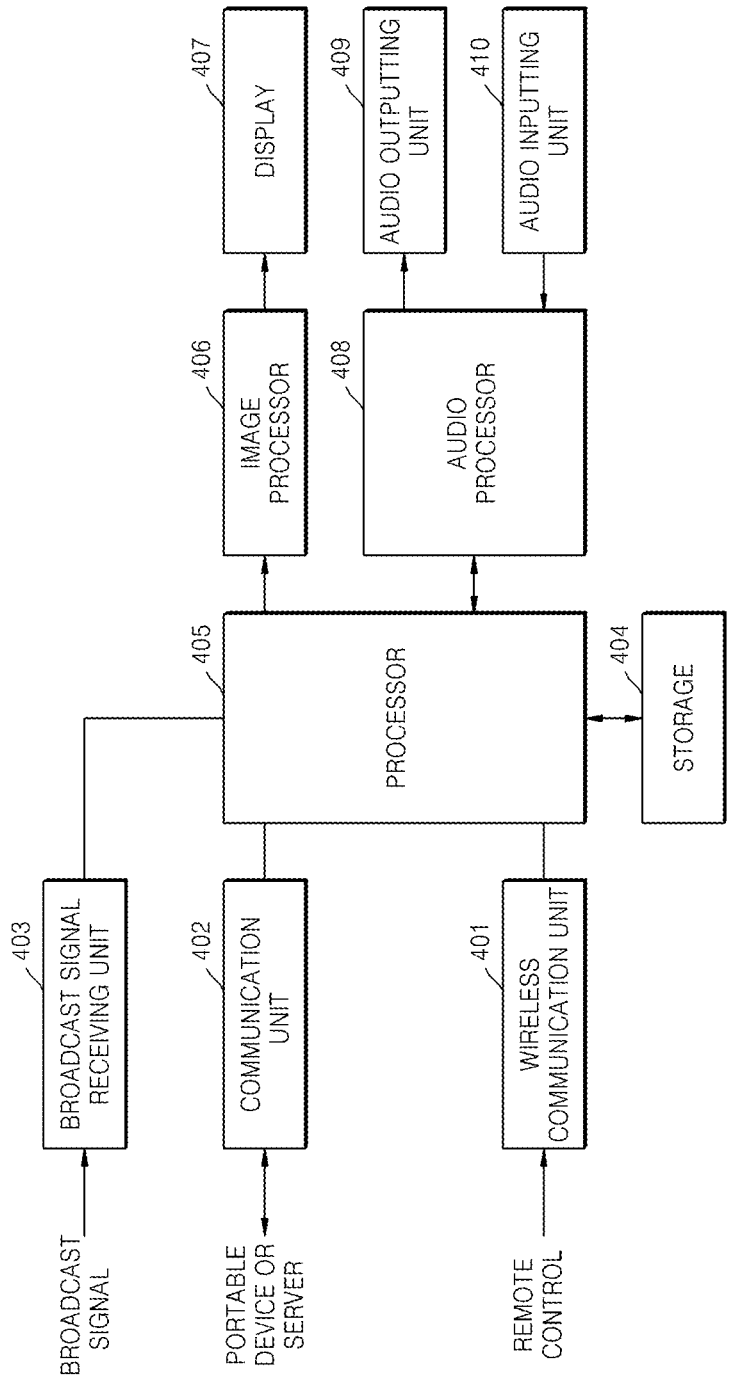
FIG. 4 is a functional block diagram which illustrates an electronic device as shown in FIG. 1A, according to an exemplary embodiment.

FIG. 4 is a functional block diagram of the electronic device 120 shown in FIG. 1A, according to an exemplary embodiment. In particular, FIG. 4 is a functional block diagram of a case in which the electronic device 120 is a TV which has a communication function.

Referring to FIG. 4, the electronic device 120 includes a wireless communication unit 401, a communication unit 402, a broadcast signal receiving unit 403, a storage 404, a processor 405, an image processor 406, a display 407, an audio processor 408, an audio output unit 409, and an audio input unit 410.

The wireless communication unit 401 may be configured to communicate with the wireless communication unit 302 included in the remote control 110. In particular, when the wireless communication unit 302 includes an IR transmitter, the wireless communication unit 401 includes an IR receiver, receives an infrared signal transmitted from the wireless communication unit 302, demodulates the received infrared signal, and transmits the demodulated signal to the processor 405.

When the wireless communication unit 302 includes an RF module, the wireless communication unit 401 includes an RF module, receives and demodulates an RF signal transmitted from the wireless communication unit 302, and transmits the demodulated RF signal to the processor 405.

The wireless communication unit 401 is not limited to the above-described IR module and RF module. In particular, similarly as the wireless communication unit 302, the wireless communication unit 401 may be configured based on short distance communication, such as a Bluetooth standard. If the wireless communication unit 302 is configured based on a Bluetooth standard, the wireless communication unit 401 receives data having a format based on the Bluetooth standard, demodulates the received data, and transmits the demodulated data to the processor 405.

The communication unit 402 performs wireless data communication with at least one of the portable device 100 and the server 130 via a wireless communication module. The electronic device 120 may data-communicate with the portable device 100 or the server 130 by using at least one of a wireless communication-based network such as Bluetooth network, RFID network, WiFi network, IrDA network, UWB network, ZigBee network, and NFC network, a wired communication-based network such as home phoneline networking alliance (PNA), power line communication (PLC), IEEE 1394, and wired Internet, and/or various home networks.

The processor 405 may receive contents or data required for reproducing contents from at least one of the portable device 100 and the server 130 via the communication unit 402. The processor 405 may include at least one processor, such as the processor 210 shown in FIG. 2.

The broadcast signal receiving unit 403 divides a broadcast signal received via a tuner (not shown) into an image signal and an audio signal and outputs the image signal and the audio signal. In particular, the tuner selects an RF broadcast signal, which corresponds to a channel selected by a user or any channel that is previously stored, from among RF broadcast signals received via an antenna. In addition, the tuner converts the selected RF broadcast signal into at least one of an intermediate frequency signal, a base band image, and an audio signal. The at least one of the intermediate frequency signal, the base band image, and the audio signal is transmitted to the processor 405.

The storage 404 may store at least one program for controlling and processing various signals in the processor 405 and may store information relating to an authentication of the portable device 100, device-specific information relating to the electronic device 120, and user information relating to the electronic device 120.

The processor 405 controls an overall function of an electronic device 120. The processor 405 may control the electronic device 102 to transmit and receive data to and from the portable device 100 via the communication unit 402. The at least one program stored in the storage 404 may be loaded in order to configure a user interface (UI) image according to an exemplary embodiment, and the UI image may be displayed on the display 407 via the image processor 406.

According to an exemplary embodiment, the UI image may include a UI image (or UI menu screen) which facilitates a user selection of contents to be reproduced. The UI image which facilitates the selection of contents to be reproduced may be generated by the processor 405 when the electronic device 120 reproduces contents and receives data required by the electronic device 120 for reproducing contents via at least one of the wireless communication device 401 and the communication device 402 in conjunction with an occurrence of a short distance communication between the portable device 100 and the remote control 110.

In addition, after the electronic device 120 is powered on, the UI image may include a first menu image. If a power-on state of the electronic device 120 is caused by the occurrence of the short distance communication between the remote control 110 and the portable device 100, the first menu image may include an item which facilitates a user selection relating to whether a seamless playback of contents that are being reproduced by the portable device 100 is performed, all contents are reproduced, or additional information is viewed or is stored for performing a seamless playback later.

If the power-on state of the electronic device 120 is caused by the occurrence of the short distance communication, data received from the remote control 110 or the portable device 100 may include a contents list which is stored in the portable device 100, which does not correspond to data that is not related to the contents that are being reproduced by the portable device 100. In this case, the first menu image of the electronic device 120 may include the contents list. Thus, a user may select desired contents based on the contents list provided via the first menu image.

However, if the power-on state of the electronic device 120 is not caused by the occurrence of the short distance communication and but is caused by stored information which relates to a later performance of a seamless playback, the first menu image of the electronic device 120 may include an item which facilitates a user selection relating to whether a seamless playback of contents is performed. The power-on state of the electronic device 120 caused by information stored to perform seamless playback later may be performed by a reservation function, but is not limited thereto.

The image processor 406 includes an image decoder (not shown) and a scaler (not shown). The image processor 406 may process an image output from the broadcast signal receiving unit 403 in order to display the image on a screen. The image decoder decodes a demultiplexed image signal. The scaler performs scaling in order to output resolution of the decoded image signal from the display 407. The image decoder may include various standards of decoders. For example, when the demultiplexed image signal is an image signal which complies with an MPEG-2 standard, the demultiplexed image signal may be decoded by an MPEG-2 decoder. For example, when the demultiplexed image signal is a decoded image signal which complies with an H.264 standard in accordance with a digital multimedia broadcasting (DMB) method or DVB-H, the demultiplexed image signal may be decoded by an H.264 decoder.

The display 407 may output an image which has been processed by the image processor 406. The output image may include at least one of an image which has been received from the broadcast signal receiving unit 403, a UI image, and an image which includes contents that are received from the portable device 100 or the server 130 via the communication unit 402. However, the display 407 may include a touch screen and may be used as an input device.

The audio processor 408 processes at least one of an audio signal which has been output from the broadcast signal receiving unit 403 and an audio signal which is contained in contents received via the communication unit 402, and transmits the processed audio signals to the audio output unit 409. The audio output unit 409 may be configured in various ways, and for example, may output at least one of a stereo signal, a 3.1 channel signal, and a 5.1 channel signal.

In addition, the audio processing unit 408 may process a signal which has been received from the audio input unit 410 and may transmit the processed signal to the processor 405. The audio input unit 410 may include a microphone.

Figure 5:
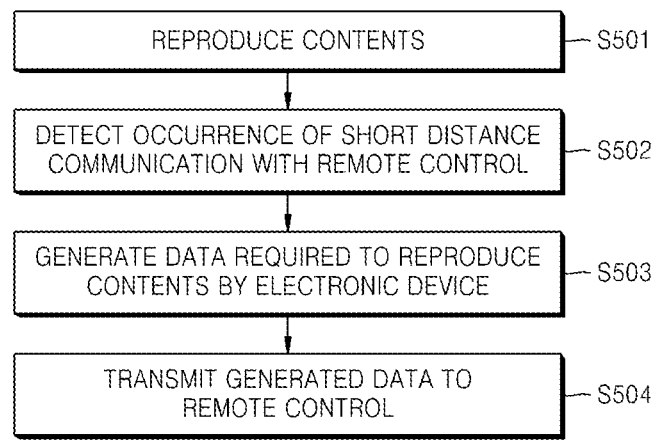
FIG. 5 is a flowchart which illustrates a contents reproducing method which is executable by using the portable device, according to an exemplary embodiment.

FIG. 5 is a flowchart which illustrates a contents reproducing method which is executable by using the portable device 100, according to an exemplary embodiment. The method of FIG. 5 may be performed by the processor 210 shown in FIG. 2.

In operation S501, the portable device 100 reproduces contents on the touch screen 203. Then, after detecting an occurrence of a short distance communication with the remote control 110 in operation S502 via the short distance communication unit 101, in operation S503, the processor 210 generates data required by the electronic device 120 for reproducing the contents that are being reproduced on the touch screen 203. As described above with reference to FIG. 2, the generated data includes at least one of contents provider information, device-specific information relating to the portable device 100, user information relating to the portable device 100, meta data relating to the contents, and information relating to a time when the contents are reproduced, which corresponds to a time when the occurrence of the short distance communication is detected.

Then, in operation S504, the processor 210 transmits the generated data to the remote control 110 via the short distance communication unit 101. The short distance communication unit 101 converts the generated data into data which has a short distance communication data exchange format and transmits the data having the short distance communication data exchange format to the remote control 110.

Figure 6:
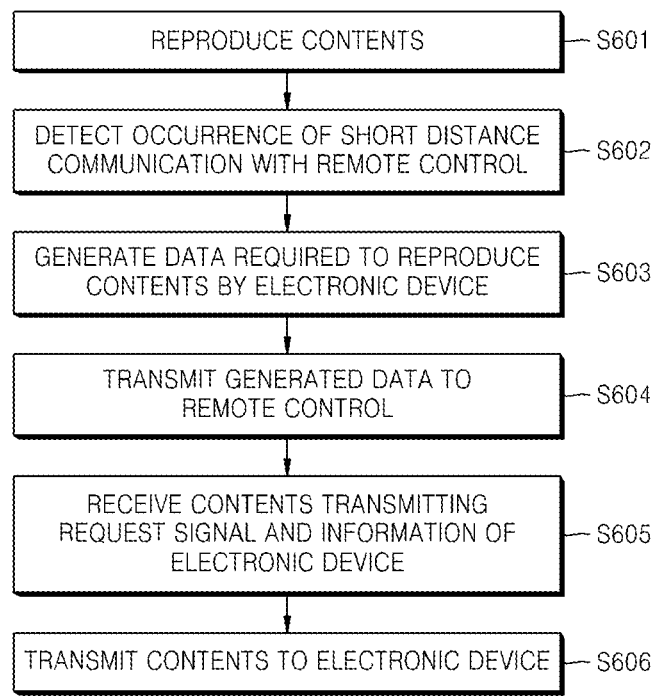
FIG. 6 is a flowchart which illustrates a contents reproducing method which is executable by using the portable device, according to another exemplary embodiment.

FIG. 6 is a flowchart which illustrates a contents reproducing method which is executable by using the portable device 100, according to another exemplary embodiment. The method of FIG. 6 may be performed by the processor 210 shown in FIG. 2. Respective operations S601, S602, S603, and S604 of FIG. 6 are the same as corresponding operations S501, S502, S503, and S504 of FIG. 5, respectively, and thus, their detailed description will be omitted.

In operation S604, the processor 210 transmits the generated data to the remote control 110 via the short distance communication unit 101, and then, in operation S605, the processor 210 receives a contents transmitting request signal from the electronic device 120 and information relating to the electronic device 120 from the electronic device 120 via the communication unit 208. The contents transmitting request signal and the information relating to the electronic device 120 may be received from the remote control 110 via the short distance communication unit 101. Thus, in operation S606, the processor 210 transmits contents to the electronic device 120 via the communication unit 208 by using the received information relating to the electronic device 120.

In this case, the processor 210 may output a message indicating a transmission state of contents, such as, for example, "transmitting contents," to the touch screen 203, or may output a message indicating a transmission state of contents, including various steps such as, for example, "begin transmitting of contents," "transmitting contents," and "finish transmitting of contents." When the message indicating the transmission state of contents, including the various steps, is displayed on the touch screen 203, the processor 210 may monitor an amount of data in the contents to be transmitted and a communication speed of the communication unit 208, and may control a time when the message indicating a transmission state of contents is output.

Figure 7:
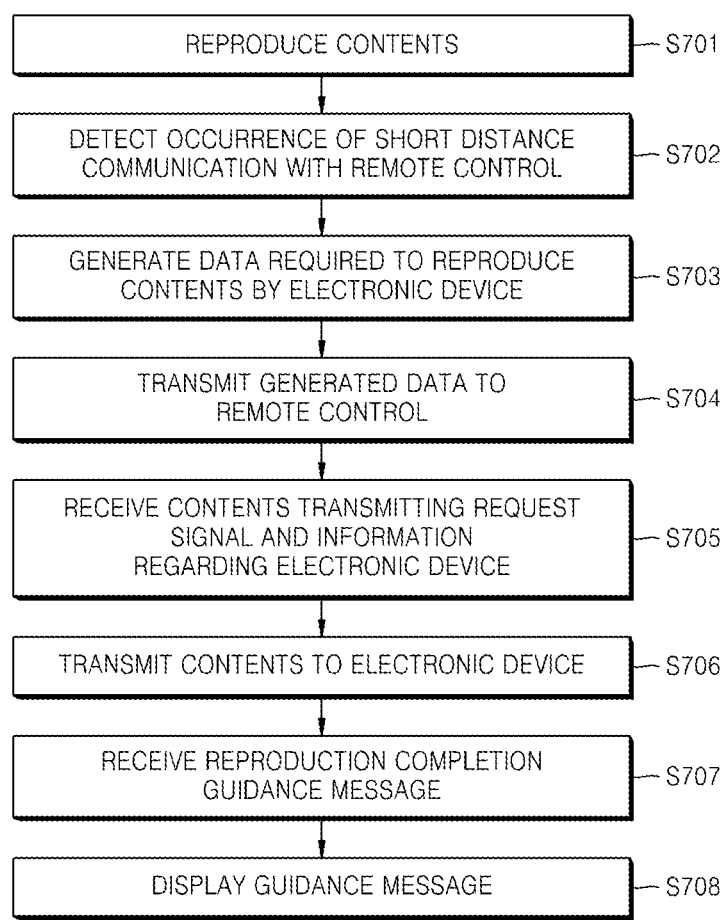
FIG. 7 is a flowchart which illustrates a contents reproducing method which is executable by using a portable device, according to another exemplary embodiment.

FIG. 7 is a flowchart which illustrates a contents reproducing method which is executable by using the portable device 100, according to another exemplary embodiment. The method of FIG. 7 may be performed by using the processor 210 shown in FIG. 2. Respective operations S701, S702, S703, S704, S705, and S706 of FIG. 7 are the same as corresponding operations S601, S602, S603, S604, S605, and S606 of FIG. 6, respectively, and thus, their detailed description will be omitted.

When the processor 210 receives a reproduction completion guidance message from the electronic device 120 via the communication unit 208 in operation S707, the processor 210 displays the received reproduction completion guidance message on the touch screen 203 in operation S708.

Figure 8:
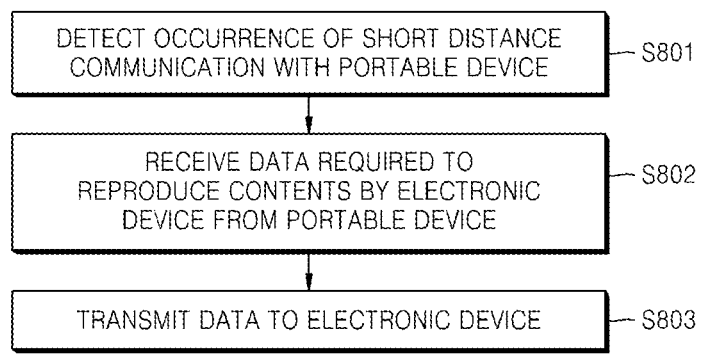
FIG. 8 is a flowchart which illustrates a contents reproducing method which is executable by using the remote control which is configured to control the electronic device, according to an exemplary embodiment.

FIG. 8 is a flowchart which illustrates a contents reproducing method which is executable by using the remote control 110 which is configured to control the electronic device 120, according to an exemplary embodiment. The method of FIG. 8 may be performed by the processor 303 shown in FIG. 3.

Referring to FIG. 8, in operation S801, the processor 303 detects an occurrence of a short distance communication between the portable device 100 and the remote control 110 via the short distance communication unit 111, and then, in operation S802, the processor 303 receives data required by the electronic device 120 for reproducing contents that are being reproduced by the portable device 100 in the electronic device 120 from the portable device 100 via the short distance communication unit 111. In conjunction with the detection of the occurrence of short distance communication, the processor 303 may transmit a power-on request signal to the electronic device 120. Thus, the electronic device 120 may recognize the power-on request signal and the occurrence of the short distance communication and may control a power-on state of the electronic device 120.

In operation S803, the processor 303 transmits received data to the electronic device 120 via the wireless communication unit 302. The received data is transmitted to the electronic device 120 in response to a data transmission request signal which is received via the user input unit 301 of the remote control device 110. In addition, as described above with reference to FIG. 3, the received data is converted into data having a data format according to the communication protocol between the electronic device 120 and the remote control 110 in the wireless communication unit 302, and the converted data is then transmitted to the electronic device 120.

As described with reference to FIG. 3, the processor 303 may transmit a power-on request signal relating to the electronic device 120 before or when the received data is transmitted to the electronic device 120.

Figure 9:
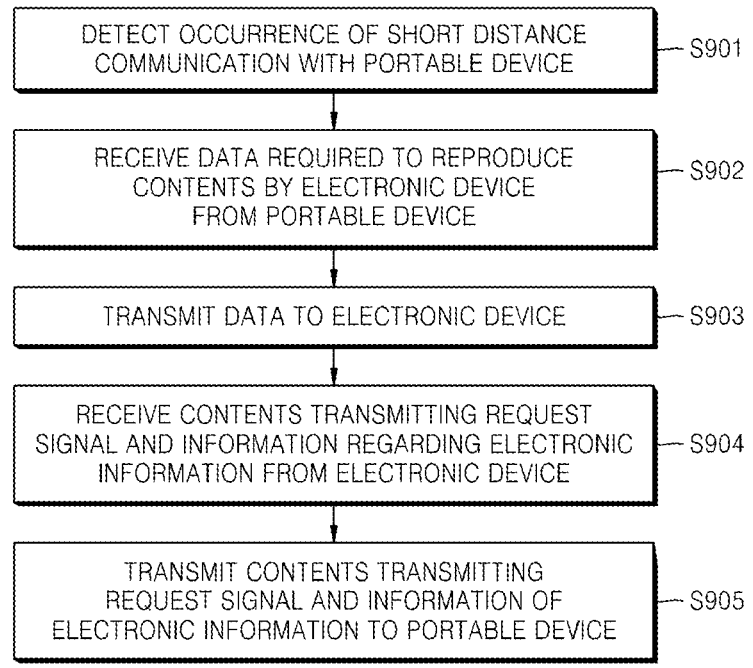
FIG. 9 is a flowchart which illustrates a contents reproducing method which is executable by using the remote control which is configured to control the electronic device, according to another exemplary embodiment.

FIG. 9 is a flowchart which illustrates a contents reproducing method which is executable by using the remote control 110 which is configured to control the electronic device 120, according to another exemplary embodiment. The method of FIG. 9 may be performed by the processor 303 shown in FIG. 3. Respective operations S901, S902, and S903 of FIG. 9 are the same as corresponding operations S801, S802, and S803 of FIG. 8, respectively, and thus, their detailed description will be omitted.

In operation S904, the processor 303 receives a contents transmitting request signal and information relating to the electronic device 120 from the electronic device 120 via the wireless communication unit 302, and then, in operation S905, the processor 303 transmits the contents transmitting request signal and the information relating to the electronic device 120 to the portable device 100 via the short distance communication unit 111.

FIG. 10 is a flowchart which illustrates a contents reproducing method which is executable by using the electronic device 120, according to an exemplary embodiment. The method of FIG. 10 may be performed by the processor 405 shown in FIG. 4.

In operation S1001, the processor 405 receives information from the remote control 110 via the communication unit 402. In operation S1002, the processor 405 analyzes received data. In operation S1003, the processor 405 transmits a contents transmitting request signal to a contents provider based on a result of analyzing the data. When the result of the analyzing indicates that the contents provider is the server 130, the processor 405 transmits the contents transmitting request signal to the server 130 via the communication unit 402. When the result of the analyzing indicates that the contents provider is the portable device 100, the processor 405 transmits the contents transmitting request signal to the portable device 100 via the communication unit 402. When the result of the analyzing indicates that the contents provider includes both of the server 130 and the portable device 100, the processor 405 outputs a UI image (or UI menu screen) to the display 407 such that a user may select a contents provider.

In operation S1004, the processor 405 receives contents from the contents provider, via the communication unit 402. In operation S1005, when the received contents are combined with an image signal and an audio signal, the processor 405 reproduces the image signal by using the image processor 406 and the display 407, and reproduces the audio signal by using the audio processor 408 and the audio output unit 409.

In this case, when the received contents have a plurality of resolutions, the processor 405 receives information relating to the plurality of resolutions via the communication unit 402. The processor 405 may display a UI image (or UI menu screen) which shows a user the information relating to the plurality of resolutions on the display 407. Thus, when a user selects one resolution, information relating to the selected resolution is transmitted to the contents provider, and thus contents having the resolution selected by the user may be received.

However, when the received contents have a plurality of resolutions and the contents provider has information relating to a resolution of the electronic device 120, the processor 405 may receive contents suitable for the resolution of the electronic device 120 via the communication 402, and may directly reproduce the contents by using the image processor 406 and the display 407.

FIG. 11 is a flowchart which illustrates a contents reproducing method which is executable by using the electronic device 120, according to another exemplary embodiment. The method of FIG. 11 may be performed by the processor 405.

Similarly as described above with respect to operation S1001, in operation S1101, the processor 405 receives information from the remote control device 110 via the wireless communication unit 401, and then, in operation S1102, the processor 405 analyzes received data.

In operation S1103, the processor 405 performs an authentication process relating to the portable device 100 by using data relating to the authentication process which has been detected from the analyzed data. In particular, the processor 405 compares information relating to authentication that has previously been stored in the storage 404 with the data relating to the authentication process which has been detected from the analyzed data. If the previously stored information relating to authentication is not identical to the detected data relating to the authentication process, then in operation S1104, the processor 405 does not perform a seamless playback of contents. The data relating to the authentication process may include, for example, at least one of device-specific information relating to the portable device 100 and user information relating to the portable device 100. The authentication process may refer to an authentication process relating to whether or not a seamless playback of contents is allowed.

However, as a result of the authentication process, when the device-specific information relating to the portable device 100 (e.g., unique identification information relating to the portable device 100) or the user information relating to the portable device 100 (e.g., user identification information), which is contained in the analyzed data, is identical to the previously stored information relating to authentication (e.g., information regarding contents type preference), then in operation S1105, the processor 405 transmits the contents transmitting request signal to the contents provider via the communication device 208 in accordance with the analyzing result.

Thus, in operation S1106, the processor 405 receives contents from the contents provider via the communication unit 208, and then, in operation S1107, the processor 405 reproduces the received contents by using the image processor 406, the display 407, the audio processor 408, and the audio output unit 409, similarly as described above.

Figure 12:
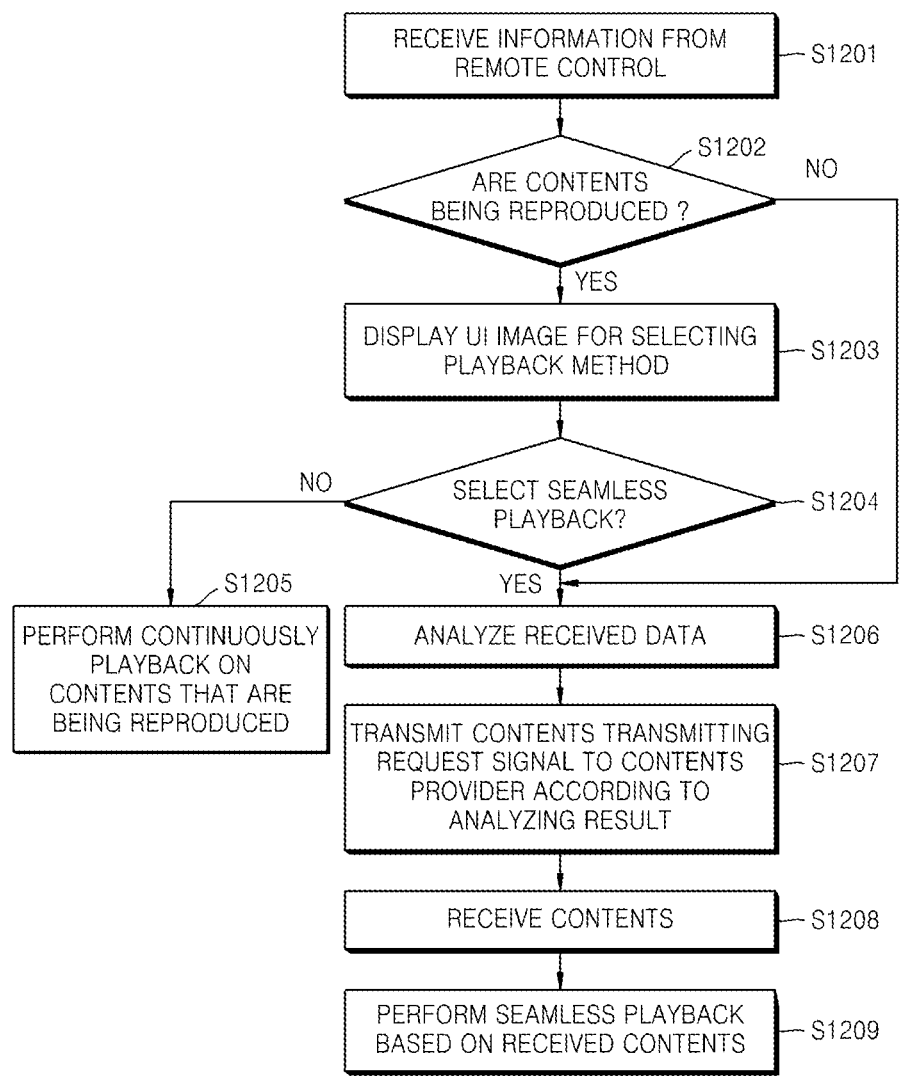
FIG. 12 is a flowchart which illustrates a contents reproducing method which is executable by using an electronic device, according to another exemplary embodiment.

FIG. 12 is a flowchart which illustrates a contents reproducing method which is executable by using the electronic device 120, according to another exemplary embodiment. FIG. 12 shows a case in which an occurrence of a short distance communication between the remote control 110 and the portable device 100 is detected when the electronic device 120 reproduces contents.

In operation S1201, the processor 405 receives information from the remote control 110 via the wireless communication unit 401 in conjunction with the occurrence of the short distance communication. If a determination is made in operation S1202 that contents are being reproduced by using at least one of the image processor 406, the display 407, the audio processor 408, and the audio output unit 409, as described above, then in operation S1203, a UI image (or UI menu screen) which facilitates a selection relating to a playback method, and in particular, whether contents that are currently being reproduced shall be reproduced or whether a seamless playback of contents reproduced by the portable device 100 shall be performed, is output to the display device 407.

When user input information that is received from the remote control 110 via the wireless communication device 401 does not indicate a selection relating to the seamless playback of contents, then in operation S1205, the processor 405 continuously reproduces contents that are currently being reproduced. Conversely, when the user input information that is received from the remote control 110 via the wireless communication unit 401 indicates a selection relating to the seamless playback of contents, then in operation S1206, the processor 405 analyzes data that is received via the communication unit 402, and then performs respective operations S1207, S1208, and S1209, which are similar to the above-described corresponding operations S1105, S1106, and S1107 of FIG. 11.

In operation S1201 of FIG. 12, when information is received from the remote control 110 via the wireless communication unit 401 in conjunction with an occurrence of a short distance communication, a power-on request signal which relates to the electronic device 120 may be contained in the received information. In this case, as described above, the processor 405 may recognize the power-on request signal in conjunction with the occurrence of the short distance communication, instead of a general power-on request signal. Thus, when the processor 405 is in a power-on state, the processor 405 disregards the power-on request signal which is received via the wireless communication unit 401. However, when the processor 405 is in a power-off state, the processor 405 may be powered on.

In addition, when contents that are subject to a seamless playback are general broadcast signals, the processor 405 may set a broadcast channel based on the analyzing result obtained in operation S1206 and may receive a broadcast signal via the broadcast signal receiving unit 403 in operation S1208.

Figure 13:
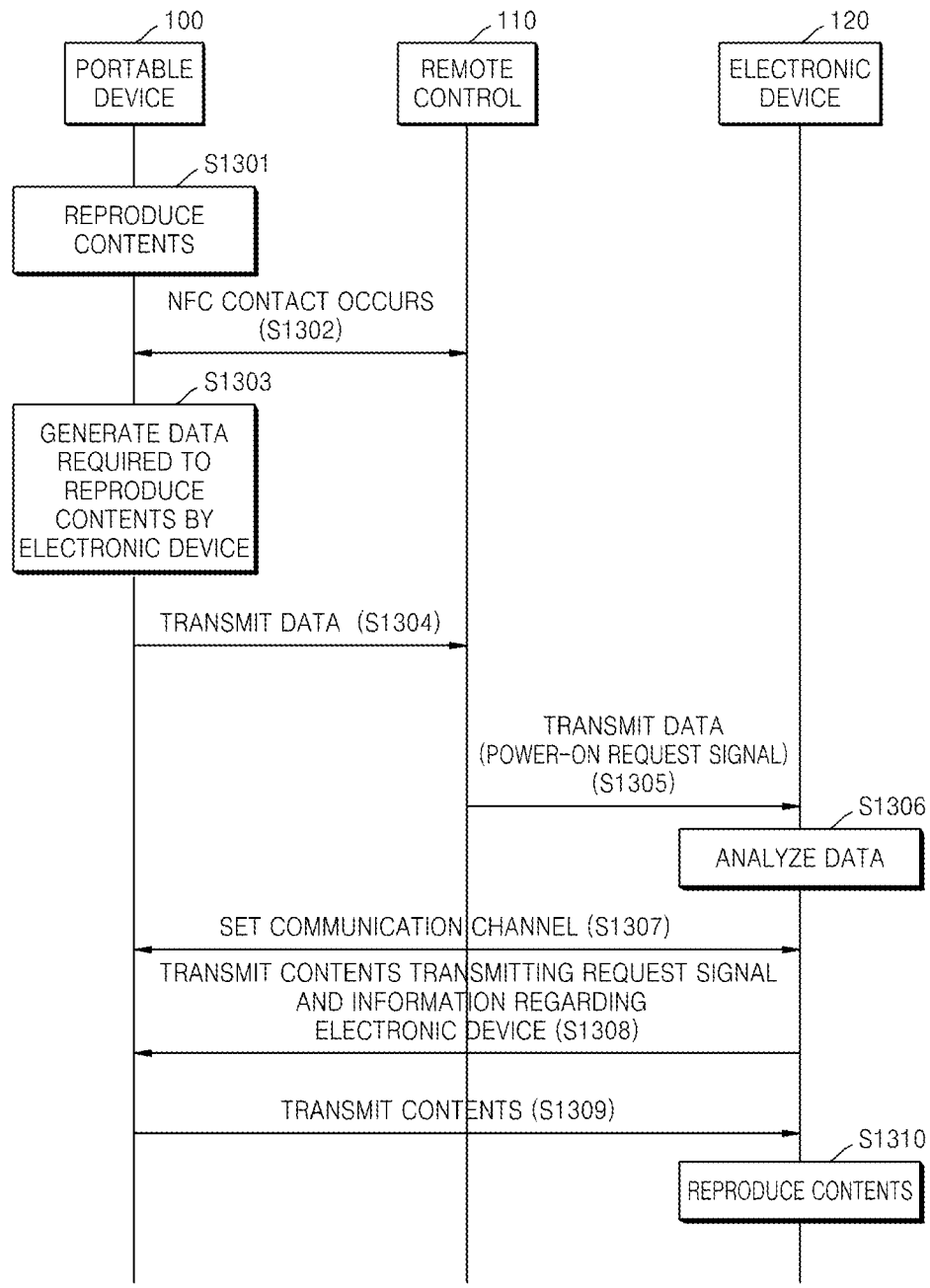
FIG. 13 is a flowchart which illustrates operations between the portable device, the remote control, and the electronic device, according to an exemplary embodiment.

FIG. 13 is a flowchart which illustrates operations between the portable device 100, the remote control 110, and the electronic device 120 when the electronic device 120 performs a seamless playback on contents that are being reproduced by the portable device 100 and provides a request for contents to the portable device 100, according to an exemplary embodiment. Hereinafter, for convenience of description, the operations are described as being performed by the portable device 100, the remote control 110, and the electronic device 120. However, it will be understood that the operations are performed by using components included in the portable device 100, the remote control 110, and the electronic device 120 as shown in FIGS. 2, 3, and 4.

When the portable device 100 reproduces contents in operation S1301, if an NFC contact between the portable device 100 and the remote control device 110 occurs in operation S1302, then in operation S1303, the portable device 100 generates data required by the electronic device 120 for reproducing contents. The generated data may include the generated data described above with reference to FIG. 5.

In operation S1304, the portable device 100 transmits data to the remote control device 110. In operation S1305, the remote control 110 transmits the received data to the electronic device 120. In this case, the power-on request signal may also be transmitted to the electronic device 120, as described above with reference to FIG. 3. In addition, in operation S1305, when data is transmitted from the remote control 110 to the electronic device 120, the data may be converted into a format according to the communication protocol between the remote control 110 and the electronic device 120, and the converted data may be transmitted to the electronic device 120.

Thus, in operation S1306, the electronic device 120 converts the received data into data having a format which is suitable for the electronic device 120 and analyzes the converted data. The data having a format suitable for the electronic device 120 refers to data having a format that may be recognized by the electronic device 120. Therefore, the format suitable for the electronic device 120 may be determined based on at least one from among the operating system of the electronic device 120, the manufacturer of the electronic device 120, and binary codes regarding control commands of the electronic device 120, but the format is not limited thereto.

When, in accordance with a result of the analyzing in operation S1306, the electronic device 120 determines to receive contents from the portable device 100, then in operation S1307, the electronic device 120 sets a channel for communication with the portable device 100. In this case, when the electronic device 120 has not previously set a function for communicating with the portable device 100, the electronic device 120 may activate the communication function based on communication function information relating to the portable device 100, which is contained in the analyzed data, and may set a communication channel with the portable device 100.

For example, when the communication function is based on a WiFi direct network, the electronic device 120 may activate a WiFi direct communication function and may set a communication channel, based on WiFi direct network included in information which is received from the portable device 100.

After the communication channel is set, in operation S1308, the electronic device 120 transmits the contents transmitting request signal and information relating to the electronic device 120 to the portable device 100 by using the set communication channel. Thus, when contents are transmitted by the portable device 100 in operation S1309, the electronic device 120 receives the transmitted contents from the portable device 100, and reproduces the received contents in operation S1310. The communication channel may be set by using a short distance communication protocol other than the above-described WiFi direct. For example, the communication channel may be set up by using a short distance communication protocol, such as Bluetooth.

Figure 14:
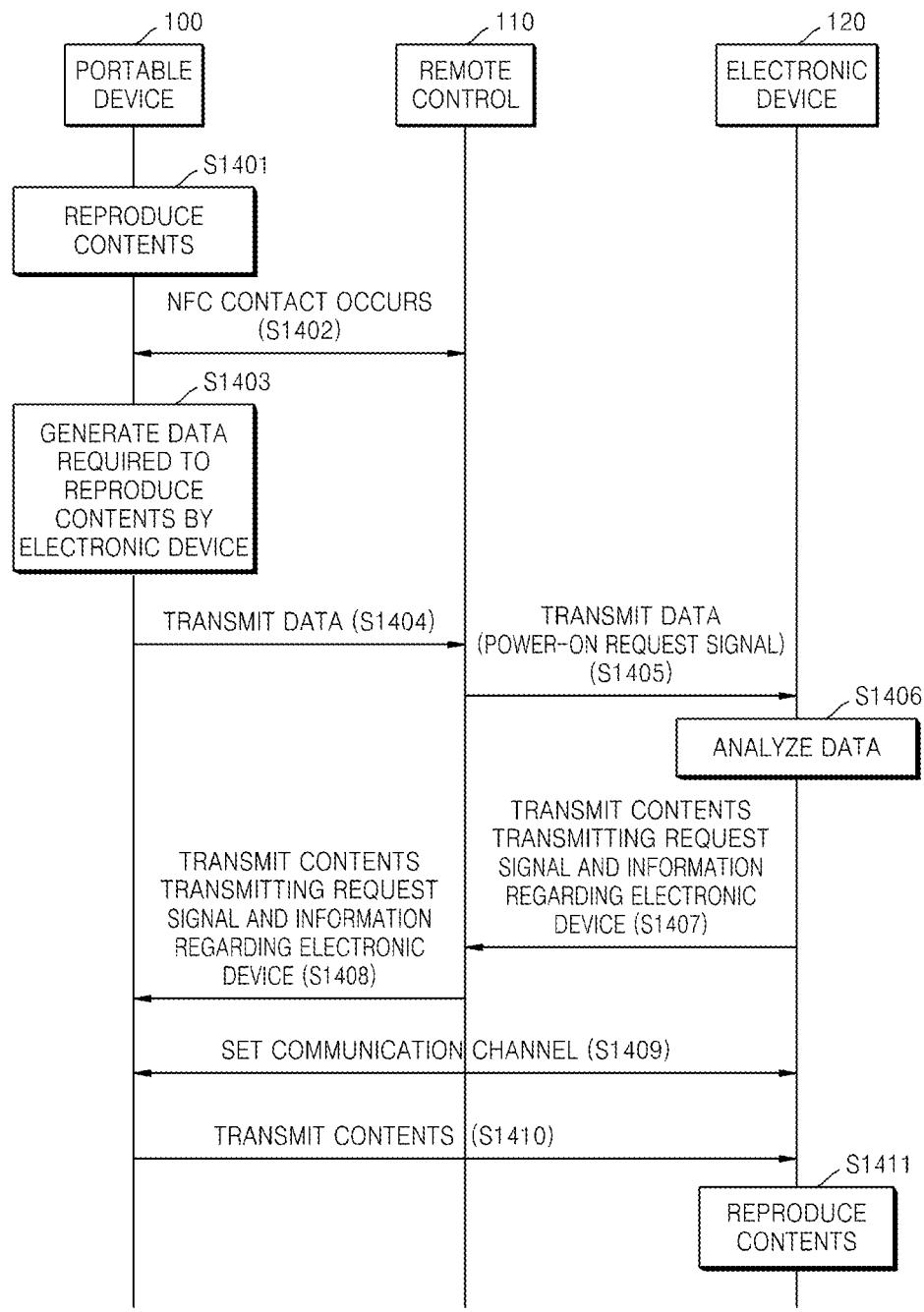
FIG. 14 is a flowchart which illustrates operations between the portable device, the remote control, and the electronic device, according to another exemplary embodiment.

FIG. 14 is a flowchart which illustrates operations between the portable device 100, the remote control 110, and the electronic device 120 when the electronic device 120 performs a seamless playback on contents that are being reproduced by the portable device 100 and provides a request for contents to the portable device 100, according to another exemplary embodiment. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

In FIG. 14, a contents transmitting request signal generated by the electronic device 120 and information relating to the electronic device 120 are transmitted to and received by the portable device 100 via the remote control 110. Thus, respective operations S1401, S1402, S1403, S1404, S1405, and S1406 of FIG. 14 correspond to respective operations S1301, S1302, S1303, S1304, S1305, and S1306 of FIG. 13, respectively, and thus, their detailed description will be omitted.

In operation S1407, when the electronic device 120 determines to receive contents from the portable device 100, the electronic device 120 transmits a contents transmitting request signal and information relating to the electronic device 120 to the remote control 110. The remote control 110 transmits the contents transmitting request signal and the information relating to the electronic device to the portable device in operation S1408. Thus, in operation S1409, based on the request received by the portable device 100, a communication channel between the portable device 100 and the electronic device 120 is set. In this case, when the portable device 100 has not previously set a function for communicating with the electronic device 120, the portable device 100 may activate the communication function based on the received information relating to the electronic device 120 and may set a communication channel. In particular, similarly as described above with respect to FIG. 13, when communication function information contained in the information relating to the electronic device 120 corresponds to WiFi direct, the portable device 100 may activate the WiFi direct function based on the information relating the electronic device 120, which is received from the remote control 110, and may set the communication channel accordingly.

After the communication channel is set, in operation S1410, the portable device 100 transmits contents to the electronic device 120, and the electronic device 120 then reproduces the contents in operation S1411. The communication channel may be set by using a short distance communication protocol, such as, for example, Bluetooth in addition to the above-described WiFi direct.

Figure 15:
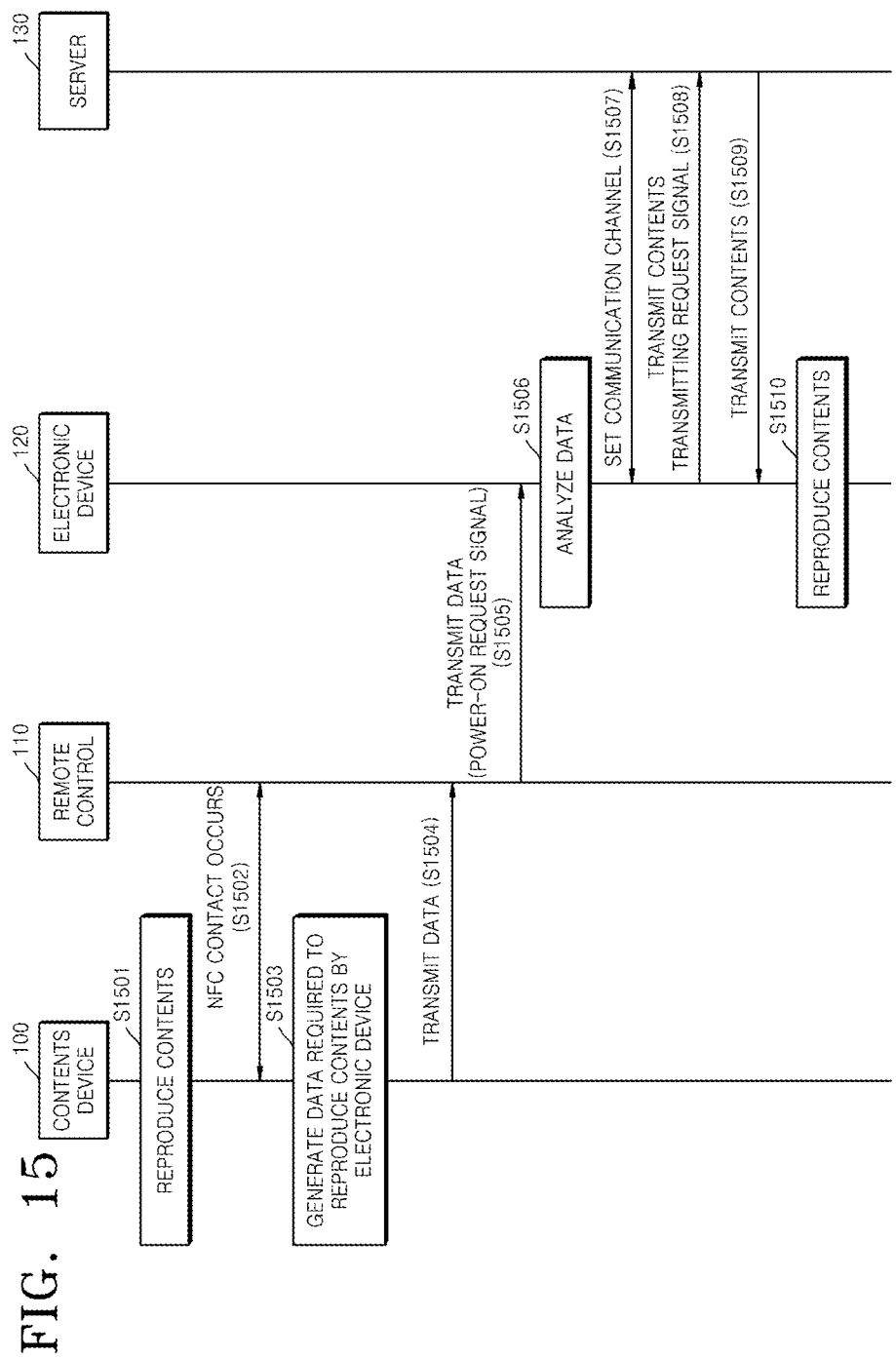
FIG. 15 is a flowchart which illustrates operations between the portable device, the remote control, the electronic device, and a server, according to an exemplary embodiment.

FIG. 15 is a flowchart which illustrates operations between the portable device 100, the remote control device 110, the electronic device 120, and the server 130 when the electronic device 120 provides a request for contents to the server 130, according to an exemplary embodiment. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

Respective operations S1501, S1502, S1503, S1504, S1505, and S1506 of FIG. 15 correspond to respective operations S1301, S1302, S1303, S1304, S1305, and S1306, of FIG. 13, respectively, and thus, their detailed description will be omitted.

In operation S1507, when the electronic device 120 determines to receive contents from the server 130, the electronic device 120 sets a communication channel with the server 130. In order to set the communication channel between the electronic device 120 and the server 130, data may be transmitted and received between the electronic device 120 and the server 130. The communication channel between the electronic device 120 and the server 130 may be set up based on at least one of the wireless communication protocols or the wired communication protocols described above regarding the communication unit 402 of FIG. 4. The communication channel between the electronic device 120 and the server 130 may be automatically set up by using information regarding the server 130 that is included in the data received from the portable device 100 and/or information regarding a user of the portable device 100. However, information used for setting up the communication channel between the electronic device 120 and the server 130 is not limited thereto.

After the communication channel is set, in operation S1508, the electronic device 120 transmits the contents transmitting request signal to the server 130 by using information regarding contents included in the received data. The server 130 searches for contents by using meta data relating to contents indicated in the received contents transmitting request signal and, in operation S1509, transmits the searched contents to the electronic device 120. Then, in operation S1510, the electronic device 120 reproduces the received contents.

FIGS. 5 through 15 show respective cases in which, when the portable device 100 reproduces contents, in conjunction with an occurrence of a short distance communication, such as an NFC contact, between the portable device 100 and the remote control 110, the electronic device 120 performs a seamless playback of contents that are being reproduced by the portable device 100.

However, the above-described exemplary embodiments may also be applied to contents that are in a pause state in the portable device 100, instead of the above-described contents that are being reproduced by the portable device 100. In this case, the data that is required by the electronic device 120 and is generated by the portable device 100 may include information relating to a playback position of contents corresponding to a time when contents are paused.

FIGS. 16A, 16B, 17, 18, 19, 20, and 21 are flowcharts which illustrate respective cases in which the portable device 100 performs a seamless playback when the electronic device 120 reproduces contents, in conjunction with an occurrence of a short distance communication, such as an NFC contact, between the remote control 110 and the portable device 100, according to exemplary embodiments.

Figure 16A:
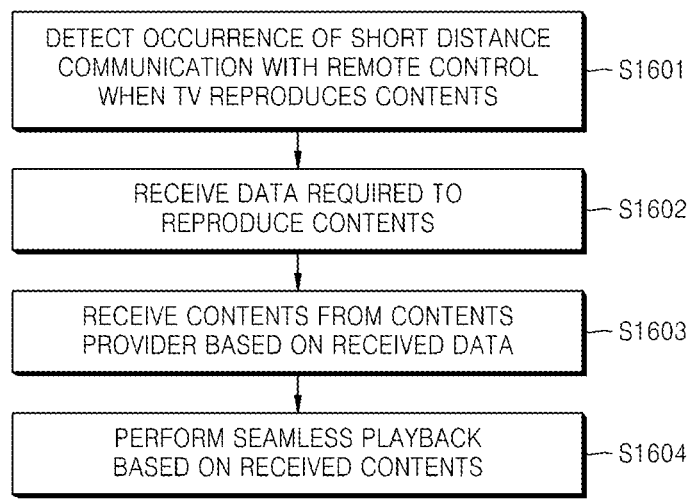
FIG. 16A is a flowchart which illustrates a contents reproducing method which is executable by using the portable device, according to another exemplary embodiment.

FIG. 16A is a flowchart which illustrates an operation the portable device 100, according to an exemplary embodiment. The operation of FIG. 16A may be performed by the processor 210.

In operation S1601, when the electronic device 120 reproduces contents and the communication unit 208 detects an occurrence of a short distance communication between the remote control 110 and the portable device, in operation S1602, the processor 210 receives data required by the portable device 100 for reproducing the contents that are being reproduced by the electronic device 120 from the remote control 110 via the communication unit 208, or directly receives the data from the electronic device 120 via the communication unit 208. The received data may include at least one of contents provider information, device information relating to the electronic device 120, user information relating to the electronic device 120, meta data relating to the contents, and information relating to a playback time indicating a position when the contents are reproduced, which corresponds to a time when an occurrence of a short distance communication is detected.

The processor 210 performs an authentication process which relates to the electronic device 120 by using at least one of the device information relating to the electronic device 120 and the user information relating to the electronic device 120, at least one of which is contained in the received data. The authentication process may be performed by comparing the user information relating to the electronic device 120 or the device information relating to the electronic device 120, which have previously been stored in the storage 207, with the received information. The authentication process may refer to an authentication process which relates to whether or not a seamless playback of contents is allowed. When authentication is successful, in operation S1603, the processor 210 receives the contents from a contents provider based on the data received via the communication unit 208. However, when authentication fails, the processor 210 does not perform a seamless playback of the contents.

Figure 16B:
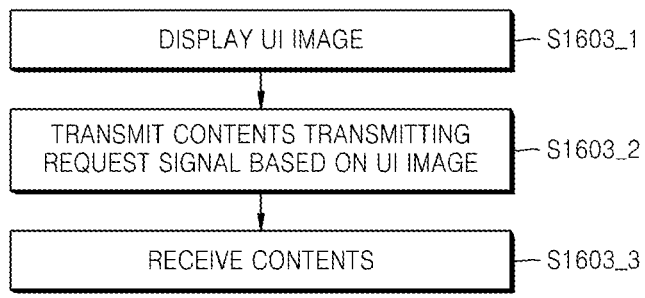
FIG. 16B is a detailed flowchart which illustrates an operation of receiving contents from a contents provider as shown in FIG. 16A, according to an exemplary embodiment.

The receiving of the contents in operation S1603 may be performed in accordance with operations which are illustrated in FIG. 16B. FIG. 16B is a detailed flowchart which illustrates an operation of receiving contents from a contents provider, according to an exemplary embodiment.

Referring to FIG. 16B, in operation S1603_1, the processor 210 displays a UI image (or a UI menu screen) on the touch screen 203 via which a contents provider may be selected based on the data received via the short distance communication unit 101, on the touch screen 203. When a selection of the contents provider is detected based on the UI image being displayed via the touch screen 203, in operation S1603_2, the processor 210 transmits a contents transmitting request signal to the selected contents provider via the communication unit 208. Thus, in operation S1603_3, the processor 210 receives contents from the selected contents provider via the communication unit 208.

Referring to FIG. 16A, when the received contents are combined with an image signal and an audio signal, in operation S1604, the processor 210 performs a seamless playback based on the received contents via the touch screen 203 and the audio output unit 206. When the received contents include the image signal, the processor 210 reproduces the received contents via the touch screen 203. The received contents may be seamlessly reproduced by using the received in operation S1602.

Subsequent operations to the above-described operation S1602 may be performed based on a contents reproducing request signal that is received via at least one of the user input unit 201, the touch screen 203, the sensor 202, and the audio input unit 205 of the portable device 100.

Figure 17:
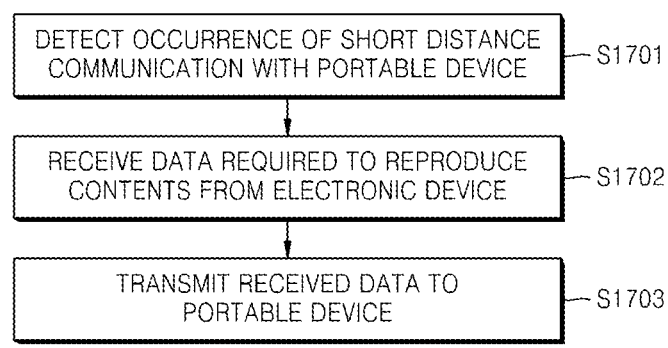
FIG. 17 is a flowchart which illustrates an operation of the remote control, according to another exemplary embodiment.

FIG. 17 is a flowchart which illustrates an operation which is executable by using the remote control 110, according to another exemplary embodiment. The operation of FIG. 17 may be performed by the processor 303.

In operation S1701, the processor 303 detects an occurrence of a short distance communication between the portable device 100 and the remote control device 110 via the short distance communication unit 111, and, then, in operation S1702, the processor 303 receives data required by the portable device 100 for reproducing contents that are being reproduced by the electronic device 120 from the electronic device 120 via the wireless communication device 302.

Figure 18:
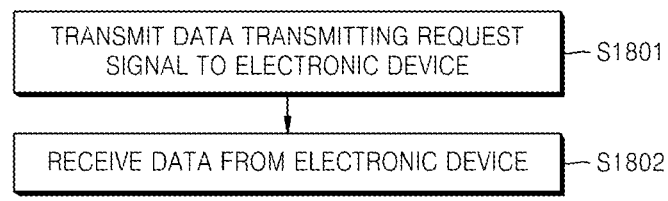
FIG. 18 is a detailed flowchart which illustrates an operation for receiving data from the electronic device referred to in FIG. 17, according to an exemplary embodiment.

The receiving of the contents from the electronic device 120 may be performed in accordance with operations which are illustrated in FIG. 18. FIG. 18 is a detailed flowchart which illustrates an operation for receiving data from the electronic device 120, according to an exemplary embodiment.

Referring to FIG. 18, when the processor 303 detects the occurrence of the short distance communication between the portable device 100 and the remote control 110 via the short distance communication device 111, in operation S1801, the processor 303 transmits a data transmitting request signal to the electronic device 120 via the wireless communication unit 302. Thus, in operation S1802, the processor 303 receives data from the electronic device 120 via the wireless communication unit 302. The received data may include a response signal with respect to the data transmitting request signal.

Referring to FIG. 17, the processor 303 receives data required for reproducing contents from the electronic device 120 via the wireless communication unit 302, and then, in operation S1703, the processor 303 transmits the received data to the portable device 100 via the short distance communication unit 111.

Figure 19:
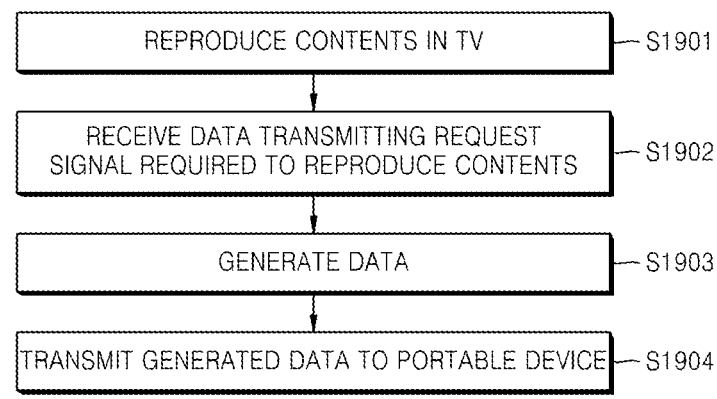
FIG. 19 is a flowchart which illustrates an operation of the electronic device, according to another exemplary embodiment.

FIG. 19 is a flowchart which illustrates an operation of the electronic device 120, according to another exemplary embodiment. The method illustrated in FIG. 19 may be performed by the processor 405.

In operation S1901, the electronic device 120 reproduces contents. Then, in operation S1902, the processor 405 receives a data transmitting request signal which is required by the portable device 100 in order to perform, by the portable device 100, a seamless playback of contents that are being reproduced by the electronic device 120. The data transmitting request signal is received from at least one of the remote control 110, via the wireless communication device 401, and the portable device 100, via the communication unit 402. Thus, in operation S1903, the processor 405 generates data required by the portable device 100 for reproducing contents.

In operation S1904, the processor 405 transmits the generated data to the remote control 110 via the wireless communication unit 401, or transmits the generated data directly to the portable device 100 via the communication device 402.

Figure 20:
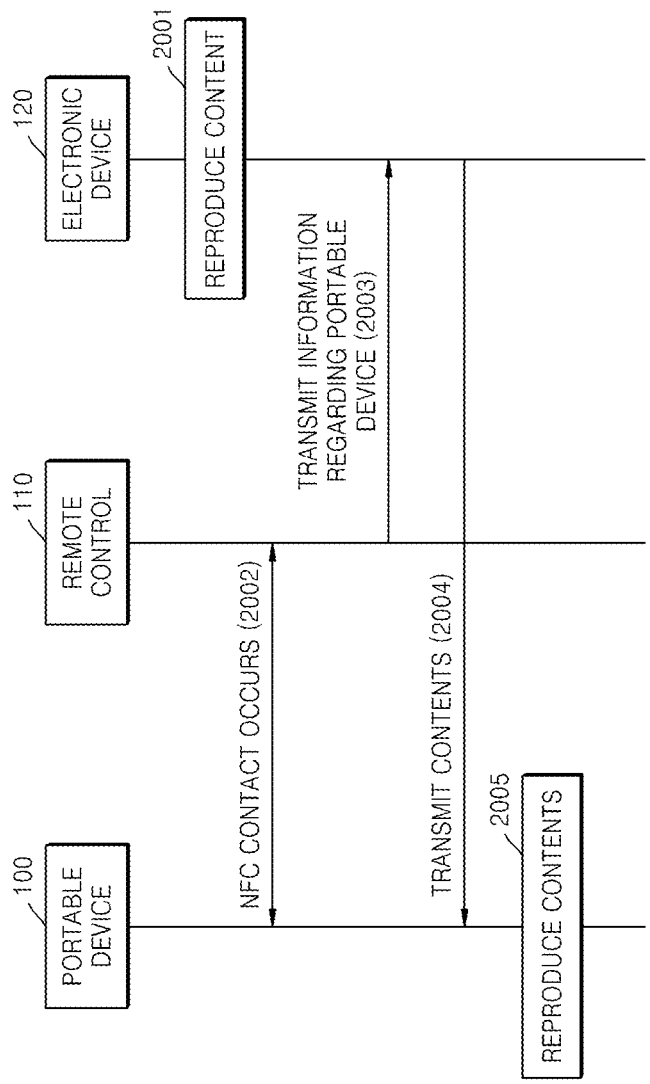
FIG. 20 is a flowchart which illustrates operations between the portable device, the remote control, and the electronic device in a contents reproducing method, according to an exemplary embodiment.

FIG. 20 is a flowchart which illustrates operations between the portable device 100, the remote control 110, and the electronic device 120 in a contents reproducing method according to an exemplary embodiment. In detail, FIG. 20 shows a case in which the remote control 110 transmits a request for data to the electronic device 120 when the portable device 100 performs a seamless playback of contents that are being reproduced by the electronic device 120 based on an occurrence of an NFC contact between the portable device 100 and the remote control 110. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

Referring to FIG. 20, when the electronic device 120 reproduces contents in operation 2001, and when an occurrence of an NFC contact between the portable device 100 and the remote control 110 is detected in operation 2002, the remote control 110 transmits information relating to the portable device 100 to the electronic device 120 in operation 2003. The information relating to the portable device 100, which is transmitted to the electronic device 120, includes information that is transmitted from the portable device 100 to the remote control 110 based on the occurrence of the NFC contact. The information relating to the portable device 100 includes information required by the electronic device 120 for transmitting information to the portable device 100. The information relating to the portable device 100 may include, for example, information regarding communication protocols supported by the portable device 100 (e.g., WiFi direct, Bluetooth, etc.) and identification information used for setting up a communication channel for communicating with the portable device 100.

In operation 2004, the electronic device 120 transmits contents that are being reproduced by using the received information relating to the portable device 100 to the portable device 100. Thus, in operation 2005, the portable device 100 performs a seamless playback of the contents. In the operation 2004, in order to transmit the contents from the electronic device 120 to the portable device 100, the electronic device 120 may set up a communication channel between the portable device 100 and the electronic device 120 by using the information relating to the portable device 100.

Figure 21:
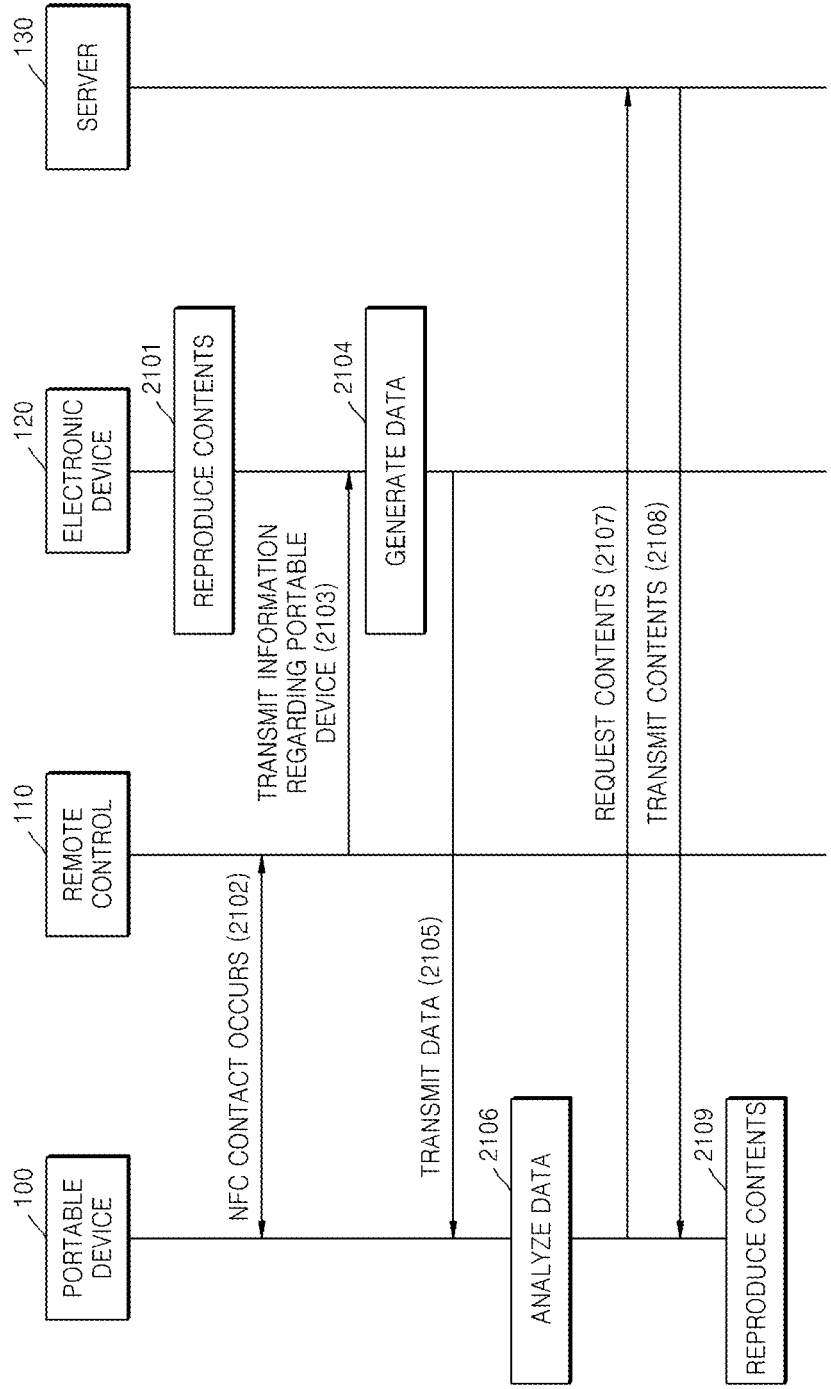
FIG. 21 is a flowchart which illustrates operations between the portable device, the remote control, the electronic device, and the server in a contents reproducing method, according to another exemplary embodiment.

FIG. 21 is a flowchart which illustrates operations between the portable device 100, the remote control 110, the electronic device 120, and the server 130 in a contents reproducing method according to another exemplary embodiment. In detail, FIG. 21 shows a case in which data required by the portable device 100 for performing a seamless playback of contents that are being reproduced by the electronic device 120 is transmitted from the electronic device 120 to the portable device 100. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

Respective operations 2101, 2102, and 2103 of FIG. 21 are the same as corresponding operations 2001, 2002, and 2003 of FIG. 20, respectively, and thus their detailed description will be omitted.

In operation 2104, the electronic device 120 generates data required by the portable device 100 for performing a seamless playback of contents that are being reproduced. Then, in operation 2105, the electronic device 120 transmits the generated data to the portable device 100, based on information relating to the portable device 100, which is received in operation 2103. To transmit the generated data to the portable device 100, the electronic device 120 sets up a communication channel with the portable device 100, as described above in relation to the operation S2003.

When the portable device 100 analyzes the received data in operation 2106 and determines to receive contents from the server 130, the portable device 100 transmits a request signal for contents to the server 130 in operation 2107. To this end, the portable device 100 may set up a communication channel to the server 130. To set up a communication channel with the server 130, the portable device 100 may use content provider information included in the data received from the electronic device 120. The portable device 100 may automatically set up a communication channel with the server 130 by using the content provider information. Alternatively, a communication channel may be set up after confirmation of a user of the portable device 100 for setting a communication channel with the server 130, or may be set up by using information input by a user of the portable device 100 based on content provider information.

When the portable device 100 receives contents from the server 130 via the communication channel set up between the portable device 100 and the server 130 in operation 2108, the portable device 100 generates the received contents in operation 2109.

Figure 22:
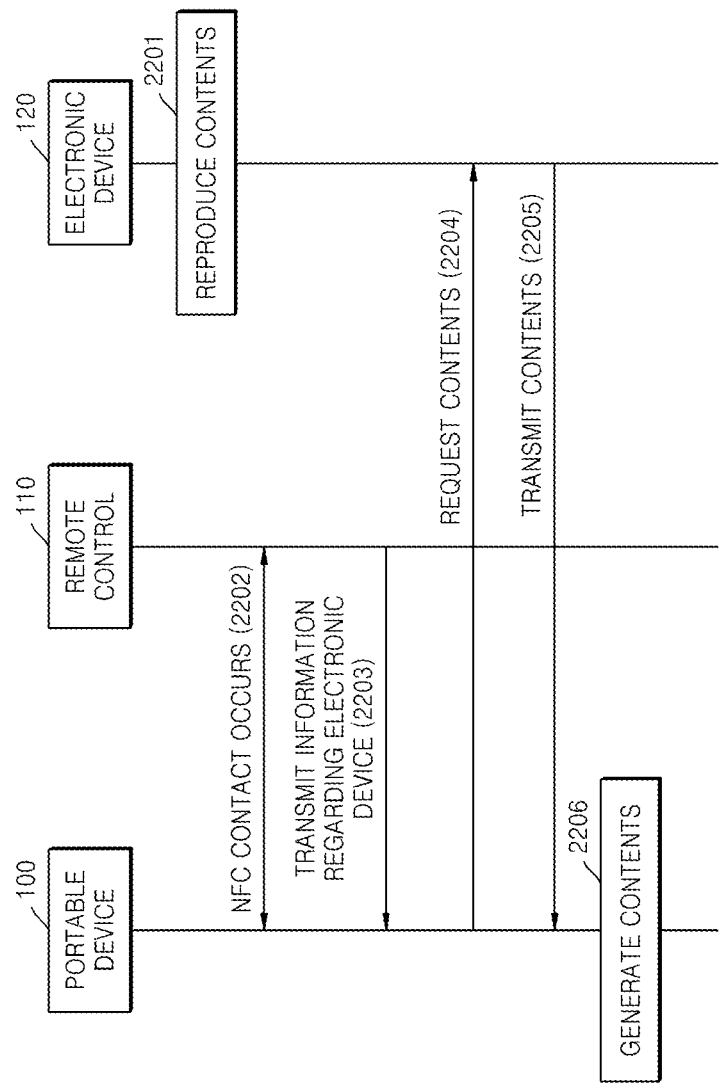
FIG. 22 is a flowchart which illustrates operations between the portable device, the remote control, and the electronic device in a contents reproducing method, according to another exemplary embodiment.

FIG. 22 is a flowchart which illustrates operations between the portable device 100, the remote control 110, and the electronic device 120 in a contents reproducing method according to another exemplary embodiment. Hereinafter, for convenience of description, the operations are described as being performed by the portable device 100, the remote control 110, and the electronic device 120. However, it will be understood that the operations are performed by using components included in the portable device 100, the remote control 110, and the electronic device 120, as shown in FIGS. 2, 3, and 4.

Referring to FIG. 22, when the electronic device 120 reproduces contents in operation 2201, and when an NFC contact between the portable device 100 and the remote control device 110 occurs in operation 2202, the remote control 110 transmits information relating to the electronic device 120 to the portable device 100 in operation 2203. Then, when the portable device 100 transmits a request signal for contents to the electronic device 120 in operation 2204, the portable device 100 receives contents from the electronic device 120 in operation 2205, and reproduces the received contents in operation 2206. In operation S2204, the portable device 100 may set up a communication channel with the electronic device 120 by using the information relating to the electronic device 120, and may transmit the contents requesting signal to the electronic device 120.

Figure 23:
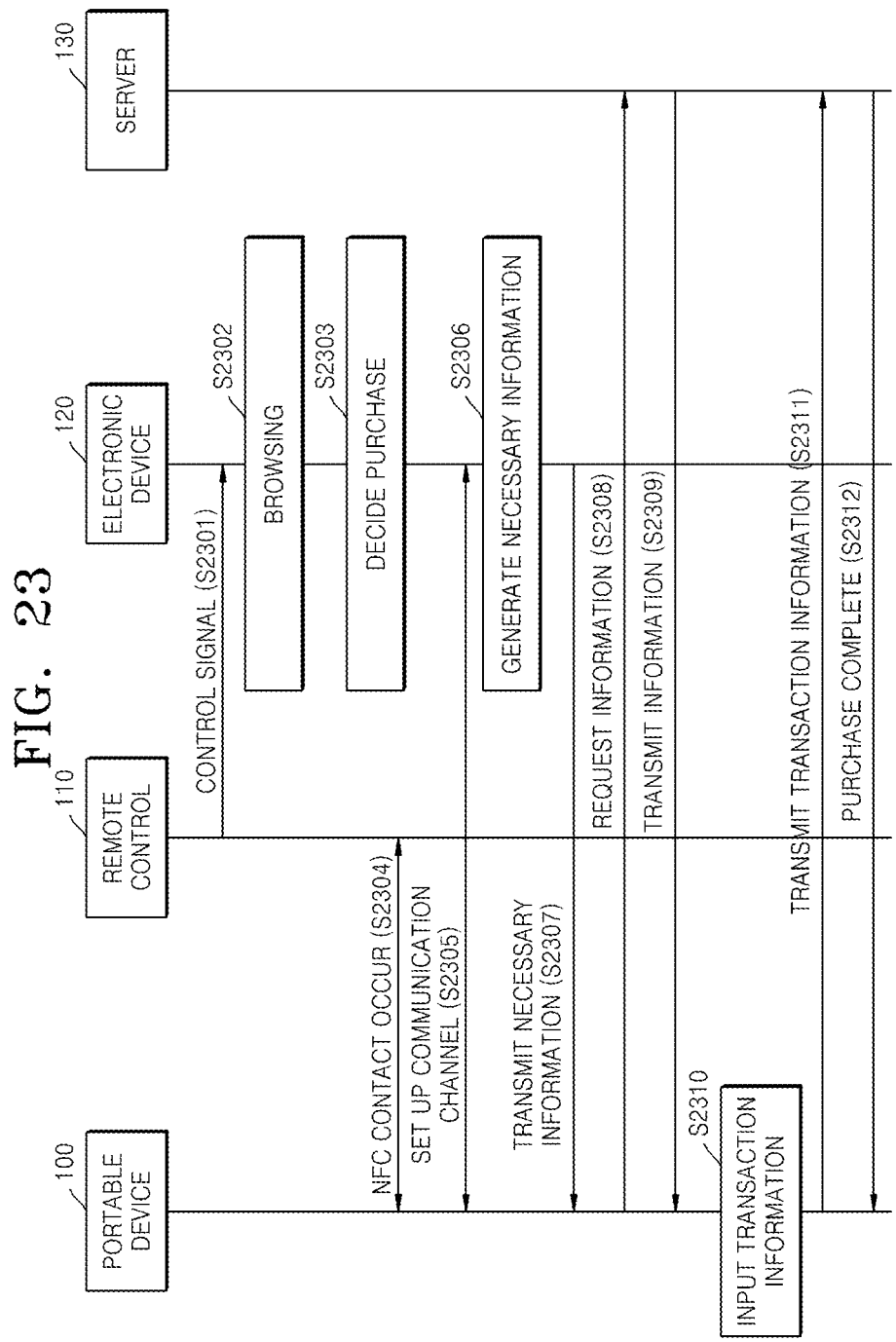
FIG. 23 is a flowchart which illustrates operations of a contents reproducing method, according to another exemplary embodiment.

FIG. 23 is a flowchart which illustrates operations of a contents reproducing method, according to another exemplary embodiment. FIG. 23 shows a case in which online shopping site-based contents are seamlessly reproduced. FIG. 23 shows a case in which a web browsing relating to shopping for an item online is performed by the electronic device 120.

Referring to FIG. 23, the electronic device 120 performs browsing relating to online shopping according to a control signal from the remote control 110 (operation S2301), purchase of a selected item is decided (operation S2302), a NFC contact occurs between the portable device 100 and the remote control 110 (operation S2304), and a communication channel is set up between the portable device 100 and the electronic device 120 (operation S2305).

The electronic device 120 generates information required by the portable device 100 to display a current purchase deciding screen (operation S2306). The information generated by the electronic device 120 may include at least one from among online shopping site location information (e.g., URL information), the purchase deciding screen information (e.g., identification information relating to a web page displayed by the electronic device 120), and online shopping site access information (e.g., user log-in information and password information), but such information is not limited thereto.

The electronic device 120 transmits the generated information to the portable device 100 (operation S2307). The portable device 100 submits a request for information to the server 130 by using the received information (operation S2308). In the operation S2308, the portable device 100 sets up a communication channel with the server 130 by using the received information. Here, the received information used herein may include online shopping site location information and online shopping site access information, but such information is not limited thereto. The server 130 is a server for operating the online shopping site and may be a virtual server.

A request signal which is transmitted from the portable device 100 to the server 130 after the communication channel is set up may at least include the purchase deciding screen information.

In response to the received information request signal, the server 130 transmits information to the portable device 100 (operation S2309). Therefore, the portable device 100 displays a purchase deciding screen.

When a user of the portable device 100 inputs payment information (or transaction information) (operation S2310), the portable device 100 transmits the input payment information to the server 130 (operation S2311). When a purchase is completed based on the transmitted information, the server 130 transmits a purchase complete message to the portable device 100 (operation S2312).

FIG. 23 shows a case in which the portable device 100 and the server 130 are directly connected to each other and exchange payment information. Therefore, if there is no payment-related user information stored in the electronic device 120 and such payment-related user information is only stored in the portable device 100, the user may easily input payment information by using the portable device 100.

Furthermore, the exemplary embodiment shown in FIG. 23 may be modified, such that payment information is to be transmitted to the server 130 via the electronic device 120. In this case, the electronic device 120 may only generate the purchase deciding screen information in the operation S2306 and may transmit the purchase deciding screen information to the portable device 100 in the operation S2307. In this case, a purchase complete message may be transmitted to the portable device 100 via the electronic device 120. Here, the electronic device 120 may display a screen image which is synchronized with a screen image displayed on the portable device 100. Alternatively, the electronic device 120 may not display the screen image and may only transmit a purchase complete message.

Furthermore, FIG. 23 shows a case in which, after a NFC contact occurs between the portable device 100 and the remote control 110, a direct communication channel is set up between the portable device 100 and the electronic device 120. However, the exemplary embodiment shown in FIG. 23 may be modified, such that a communication channel is set up between the portable device 100 and the electronic device 120 via the remote control 110. In this case, the information generated by the electronic device 120 may be transmitted from the electronic device 120 to the portable device 100 via the remote control 110.

Furthermore, FIG. 23 show a case in which a NFC contact occurs between the portable device 100 and the remote control 110 after purchase is decided. However, the operations shown in FIG. 23 may also be applied to a case in which a NFC contact occurs during an arbitrary browsing for online shopping. For example, if the NFC contact occurs during selection of items to purchase, the electronic device 120 may transmit required information to the portable device 100, such that the purchase items selection screen is displayed on the portable device 100.

Furthermore, the exemplary embodiment shown in FIG. 23 may be modified, such that, during browsing for purchasing items, the electronic device 120 continuously performs browsing for purchasing items when a NFC contact occurs between the portable device 100 and the remote control 110.

Figure 24:
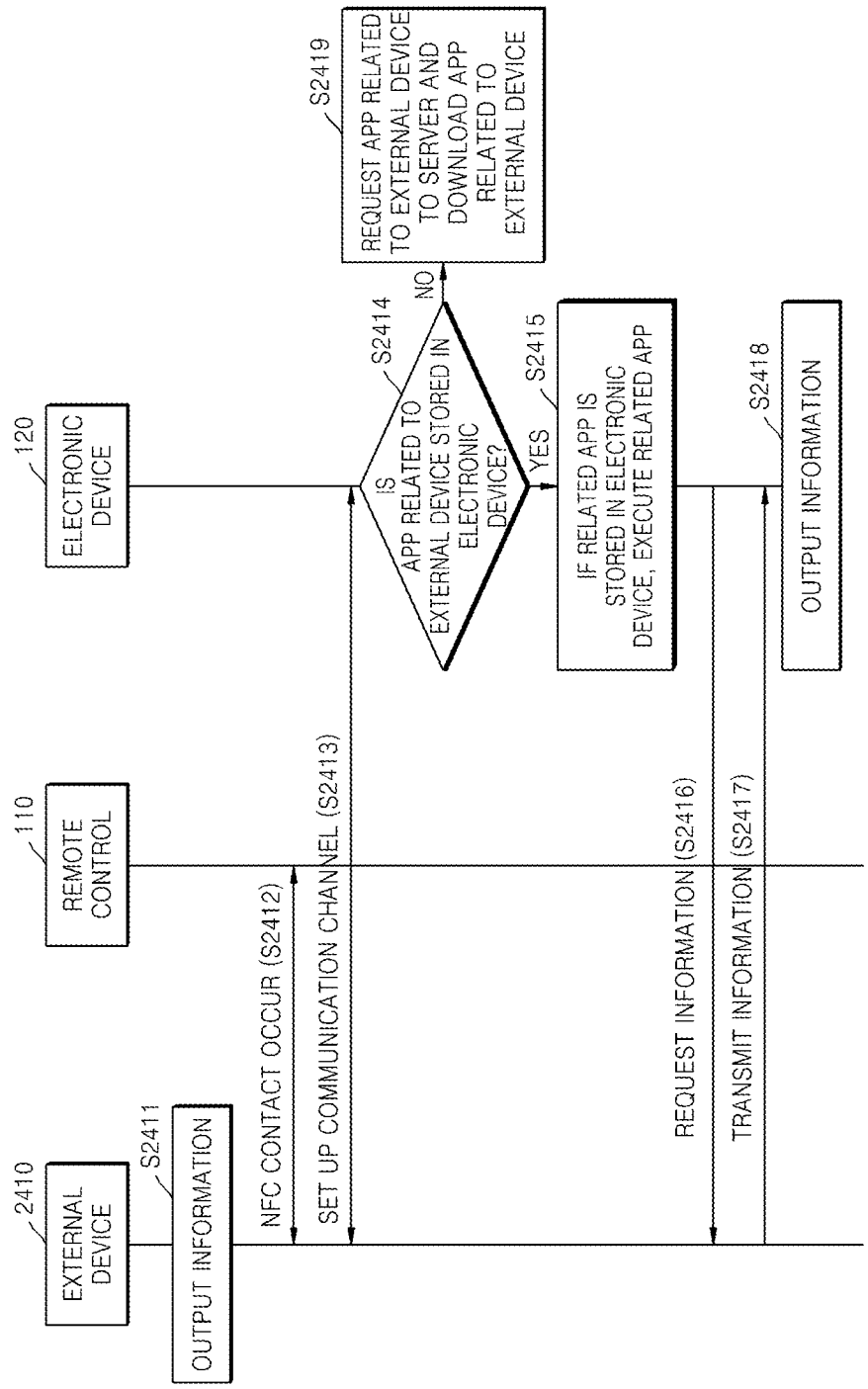
FIG. 24 is a flowchart which illustrates operations of a method for outputting information, according to another exemplary embodiment.

FIG. 24 is a flowchart which illustrates operations of a method for outputting information, according to another exemplary embodiment. According to type of information output, FIG. 24 may be considered as a flowchart of operations of a contents reproducing method. For example, if the external device 2410 is a camera and is outputting still images or moving pictures, FIG. 24 may be considered a flowchart of operations of a content reproducing method. FIG. 24 shows case in which information being displayed by the external device 2410 is seamlessly displayed by the electronic device 120.

The external device 2410 shown in FIG. 24 is a peripheral device of the electronic device 120 as described above, and may include a communicable peripheral device and/or a communicable appcessory. The external device 2410 may include a device for which operations may be controlled by an application that may be executed on the electronic device 120, but the external device 2410 is not limited thereto.

In an operation S2411, the external device 2410 outputs information. The output information may be determined based on functions of the external device 2410. For example, if the external device 2410 is an indoor and outdoor exercise meter, the output information may include at least one from among exercising location, exercising speed, calorie consumption, and information related to a user. However, the output information is not limited thereto.

If a NFC contact occurs between the external device 2410 and the remote control 110 while the information as described above are being output, a communication channel is set up between the external device 2410 and the electronic device 120 (operation S2413). The communication channel may be set up by using information relating to the electronic device 120 that is transmitted from the remote control 110 to the external device 2410 when a NFC contact occurs. The information relating to the electronic device 120 may include information regarding a communication protocol and the identification information of the electronic device 120.

When the remote control 110 transmits information regarding the stored electronic device 120 to the external device 2410, or, if NFC contact occurs, the remote control 110 may request the information regarding the electronic device 120 to the electronic device 120 and may transmit information received from electronic device 120 to the external device 2410.

However, when a NFC contact occurs, the remote control 110 may receive information regarding the external device 2410 from the external device 2410 and transmit the information regarding the external device 2410 to the electronic device 120 in order to set up a communication channel between the external device 2410 and the electronic device 120, so that a communication channel is set up between the external device 2410 and the electronic device 120 by the electronic device 120. Here, the information regarding the external device 2410 transmitted to the electronic device 120 is information required for setting up a communication channel and may include communication protocol information and identification information relating to the external device 2410, but such information is not limited thereto.

As a communication channel is set up with the external device 2410, the electronic device 120 determines whether an application relating to the external device 2410 is stored in the electronic device 120 by using the information regarding the external device 2410 which is received from the external device 2410 (operation S2414). The information regarding the external device 2410 may include information required for executing an application relating to the external device 2410, e.g., identification information relating to the external device 2410 and identification information relating to the application related to the external device 2410, but such information is not limited thereto. The application relating to the external device 2410 may be an application for controlling an operation of the external device 2410 based on a connection to the external device 2410.

The identification information regarding the external device 2410 may include at least one from among information regarding a model name of the external device 2410, information regarding a manufacturer of the external device 2410, and a version of the external device 2410, but such identification information is not limited thereto. For example, the identification information regarding the external device 2410 may include at least one from among data relating to a location at which the external device 2410 is manufactured and the operating system of the external device 2410.

As a result of the determination of the electronic device 120 in the operation S2414, if an application relating to the external device 2410 is stored in in the electronic device 120, the electronic device 120 automatically executes the related application (operation S2415).

Therefore, the electronic device 120 submits a request for information to the external device 2410 (operation S2416), and the external device 2410 transmits information being currently output to the electronic device 120 (operation S2417). The electronic device 120 outputs the received information (operation S2418). Therefore, the electronic device 120 may seamlessly reproduce information that is being reproduced by the external device 2410.

In an operation S2414, as a result of the determination, if no application relating to the external device 2410 is stored in the electronic device 120, the electronic device 120 uses identification information relating to the external device 2410, downloads an application relating to the external device 2410 from the server 130, and the operations S2415 through S2418 may be performed.

Here, if there are a plurality of applications which relate to the external device 2410, the server 130 provides information regarding the plurality of applications to the electronic device 120. The electronic device 120 displays information regarding the plurality of applications. A user may transmit a control signal for selecting a desired application information from among information regarding the plurality of applications to the electronic device 120 by using the remote control 110.

In response thereto, the electronic device 120 transmits information regarding the selected application to the server 130, may download the selected application from the server 130 and execute the selected application. Therefore, the electronic device 120 may perform the operations S2415 through S2418.

In the operation S2418 described above, the electronic device 120 may update information relating to the external device 2410 stored in the electronic device 120 by using the information received from the external device 2410. Here, the information relating to the external device 2410 refers to information that is generated or output by the external device 2410 after an application is executed. If the external device 2410 is a device having a function of capturing images like a camera, the operation 2411 may be modified to the operation for obtaining and storing information. When information is obtained via the external device 2410 and stored in the external device 2410 and the NFC contact occurs between the external device 2410 and the remote control 110, the information obtained and stored by the external device 2410 is transmitted to the electronic device 120. Therefore, the electronic device 120 may update the information relating to the external device 2410 which is stored in the electronic device 120 by using the information obtained and stored by using the external device 2410.

In an operation S2417, since the information transmitted from the external device 2410 to the electronic device 120 is determined based on functions supported by the external device 2410, the information transmitted from the external device 2410 to the electronic device 120 may be information relating to monitoring a function of the external device 2410 and information stored in the external device 2410. However, the present inventive concept is not limited thereto. If the information transmitted from the external device 2410 to the electronic device 120 is information which is stored in the external device 2410, the operation S2411 may be omitted.

One or more programs, each of which includes commands for executing a method for reproducing contents, according to the one or more exemplary embodiments described above, can also be embodied as computer-readable codes on a transitory or non-transitory computer-readable recording medium. The computer-readable recording medium may include any data storage device that can store data which can be thereafter read by a computer system. Examples of the computer-readable recording medium include read-only memory (ROM), random-access memory (RAM), CD-ROMs, magnetic tapes, floppy disks, optical data storage devices, and/or any other suitable medium. The computer-readable recording medium can also be distributed over network-coupled computer systems so that the computer-readable code is stored and executed in a distributed fashion.

While the present inventive concept has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. An information processing method executable by a mobile device, the mobile device comprising a communication unit configured to establish a connection to an external display device, the information processing method comprising:
    establishing a connection to the external display device via the communication unit;
    receiving information corresponding to an event from the external display device connected to the mobile device, the event being a selection of an item displayed in the external display device via an external remote configured to control the external display device;
    based on the information received from the external display device, displaying a user interface for making a payment for the selected item; and
    in response to an input received via the user interface for making the payment, controlling the communication unit to transmit, to a server via the external display device, information for the payment of the item.

2. The information processing method of claim 1, wherein the establishing the connection to the external display device is performed in response to establishing a near-field communication (NFC) connection between the mobile device and the external remote.

3. The information processing method of claim 1, wherein the connection between the external display device and the mobile device is based on wireless fidelity (Wi-Fi) direct.

4. The information processing method of claim 1, wherein the information corresponding to the event comprises at least one from among online site location information, online site access information, and identification information of a page corresponding to the selected item.

5. The information processing method of claim 4, wherein the online site access information comprises at least one from among user log-in information and user password information.

6. The information processing method of claim 1, further comprising controlling the communication unit to transmit, to the server via the external display device and in response to the receiving the information, a request for information that relates to online shopping with respect to the selected item.

7. The information processing method of claim 6, wherein the controlling the communication unit to transmit the request comprises controlling the communication unit to transmit identification information of a page corresponding to the selected item which is being displayed by the external display device.

8. A mobile device comprising:
    at least one communication unit configured to establish a connection to at least one from among an external display device and a server; and
    a processor configured to establish a connection to the external display device via one of the at least one communication unit, to receive information corresponding to an event from the external display device via the one of the at least one communication unit, the event being a selection of an item displayed in the external display device via an external remote configured to control the external display device, to display a user interface for making a payment for the selected item based on the information received from the external display device, and to control the one of the at least one communication unit to transmit, to the server via the external display device, information for the payment of the item.

9. The mobile device of claim 8, wherein the at least one communication unit is further configured to establish a connection to the external remote, and
    wherein the processor is further configured to establish the connection to the external display device in response to establishing a near-field communication (NFC) connection between the mobile device and the external remote via one of the at least one communication unit.

10. The mobile device of claim 8, wherein the connection between the external display device and the mobile device is based on wireless fidelity (Wi-Fi) direct.

11. The mobile device of claim 8, wherein the information corresponding to the event comprises at least one from among online site location information, online site access information, and identification information of a page corresponding to the selected item.

12. The mobile device of claim 11, wherein the online site access information comprises at least one from among user log-in information and user password information.

13. The mobile device of claim 8, wherein the at least one communication unit includes:
    a first communication unit configured to establish a first connection to the external remote;
    a second communication unit configured to establish a second connection to the external display device; and
    a third communication unit configured to establish a third connection to the server.

14. The mobile device of claim 8, wherein the processor is further configured to control the one of the at least one communication unit to transmit, to the server via the external display device and in response to the received information, a request for information that relates to online shopping with respect to the selected item.

15. The mobile device of claim 14, wherein the request for information includes identification information of a page corresponding to the selected item which is being displayed by the external display device.

16. A non-transitory computer readable recording medium having stored thereon a program which includes commands for executing an information processing method executable by a mobile device, the mobile device comprising a communication unit configured to establish a connection to an external display device, the information processing method comprising:
    establishing a connection to the external display device via the communication unit;
    receiving information corresponding to an event from the external display device connected to the mobile device, the event being a selection of an item displayed in the external display device via an external remote configured to control the external display device;

based on the information received from the external display device, displaying a user interface for making a payment for the selected item; and in response to an input received via the user interface for making the payment, controlling the communication unit to transmit, to a server via the external display device, information for the payment of the item.

17. The non-transitory computer readable recording medium of claim 16, wherein the establishing the connection to the external display device is performed in response to establishing a near-field communication (NFC) connection between the mobile device and the external remote.

18. The non-transitory computer readable recording medium of claim 16, wherein the connection between the external display device and the mobile device is based on wireless fidelity (Wi-Fi) direct.

19. The non-transitory computer readable recording medium of claim 16, wherein the information corresponding to the event comprises at least one from among online site location information, online site access information, and identification information of a page corresponding to the selected item.

20. The non-transitory computer readable recording medium of claim 19, wherein the online site access information comprises at least one from among user log-in information and user password information.

* * * * *